United States Patent
Kapsokavathis et al.

(12) 
(10) Patent No.: US 6,404,163 B1
(45) Date of Patent: Jun. 11, 2002

(54) METHOD AND SYSTEM FOR REGULATING A CHARGE VOLTAGE DELIVERED TO A BATTERY

(75) Inventors: Nick S. Kapsokavathis; Michael Frank Matouka, both of Shelby Township; David William Walters, Sterling Heights, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/887,959

(22) Filed: Jun. 25, 2001

(51) Int. Cl.[7] .................... H01M 10/46; H01M 10/44
(52) U.S. Cl. ..................................... 320/104
(58) Field of Search ........................ 320/104, 127, 320/128, 132, 134, 136, 147, 150; 429/51, 71, 75, 81, 83, 95; 324/426, 427, 432, 433

(56) References Cited

U.S. PATENT DOCUMENTS

| | | | |
|---|---|---|---|
| 4,028,616 A | * | 6/1977 | Stevens |
| 4,342,963 A | * | 8/1982 | Karnowski et al. |
| 4,564,798 A | * | 1/1986 | Young |
| 4,609,453 A | * | 9/1986 | Shimomura |
| 5,543,243 A | * | 8/1996 | Brecht |

* cited by examiner

Primary Examiner—Edward H. Tso
(74) Attorney, Agent, or Firm—Laura C. Hargitt

(57) ABSTRACT

A method of regulating a charge voltage delivered to a battery in an automobile, wherein the automobile has an engine and an ignition system capable of being activated with an ignition switch, is provided. The method includes the steps of periodically estimating the electrolyte temperature of the battery when the ignition switch is on, periodically sensing the voltage of the battery, using the estimated electrolyte temperature and the sensed voltage to estimate the electric current of the battery, using the estimated electric current to estimate the amp-hours into the battery, using the estimated amp-hours to estimate the state of charge of the battery when the engine is running, using the running state of charge and the estimated electrolyte temperature to determine an optimum charge voltage for the battery, using the sensed voltage to adjust the optimum charge voltage, communicating the optimum charge voltage to a generator, and using the generator to deliver a charge voltage to the battery wherein the charge voltage is regulated by the optimum charge voltage. Also, a system for implementing the method is provided. The system includes a generator, an engine control module, a sensor for sensing the temperature of air entering into the engine, an actuator capable of adjusting the idle speed of the engine, a data link, a body control module, a plurality of body controllers, and a plurality of electrical loads.

33 Claims, 12 Drawing Sheets

SOC versus Open-Circuit Voltage and Temperature

| SOC(STRTSOC) | = -20°C | = -10°C | = 0°C | = 25°C | = 50°C |
|---|---|---|---|---|---|
| 100% | tbd volts | tbd volts | tbd volts | tbd volts | tbd volts |
| 90% | tbd volts | tbd volts | tbd volts | tbd volts | tbd volts |
| 80% | tbd volts | tbd volts | tbd volts | tbd volts | tbd volts |
| 70% | tbd volts | tbd volts | tbd volts | tbd volts | tbd volts |
| 60% | tbd volts | tbd volts | tbd volts | tbd volts | tbd volts |
| 50% | tbd volts | tbd volts | tbd volts | tbd volts | tbd volts |
| 40% | tbd volts | tbd volts | tbd volts | tbd volts | tbd volts |
| 30% | tbd volts | tbd volts | tbd volts | tbd volts | tbd volts |
| 20% | tbd volts | tbd volts | tbd volts | tbd volts | tbd volts |
| 10% | tbd volts | tbd volts | tbd volts | tbd volts | tbd volts |
| 0% | tbd volts | tbd volts | tbd volts | tbd volts | tbd volts |

FIG. 10

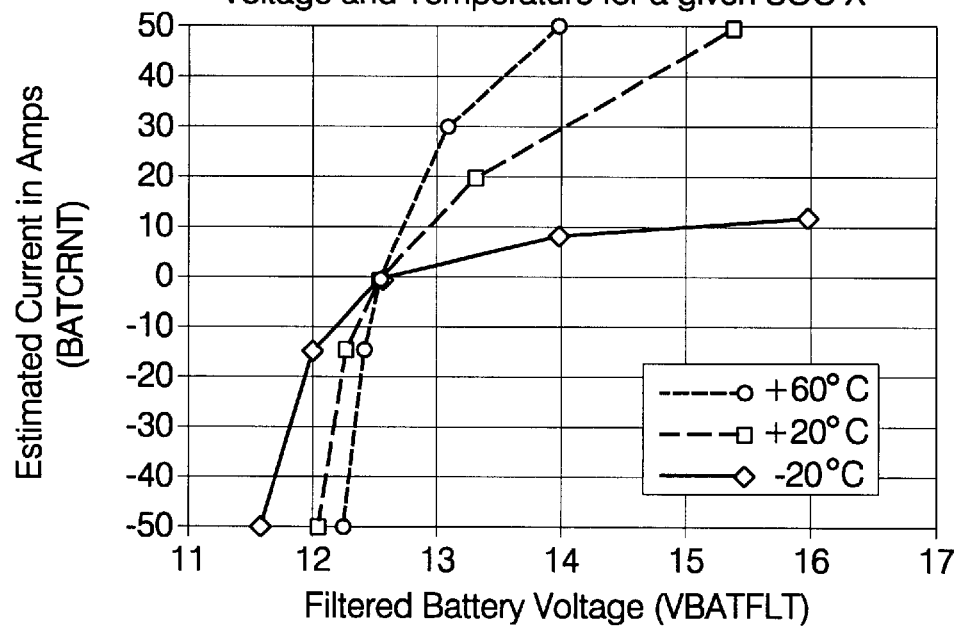

FIG. 11

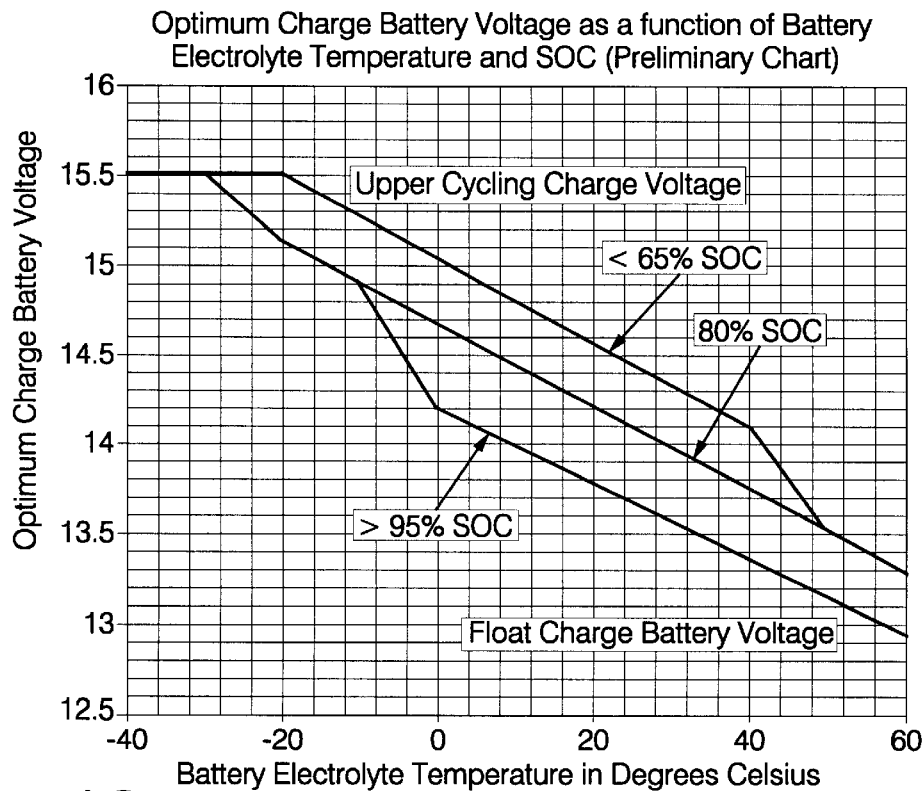
FIG. 12
| Duty Cycle | 30% | 43.7% | 45.5% | 50% | 60% | 70% | 80% | 90% |
|---|---|---|---|---|---|---|---|---|
| VBATADJ | 12.68 | 12.9 | 13.0 | 13.25 | 13.812 | 14.37 | 14.94 | 15.5 |
FIG. 13
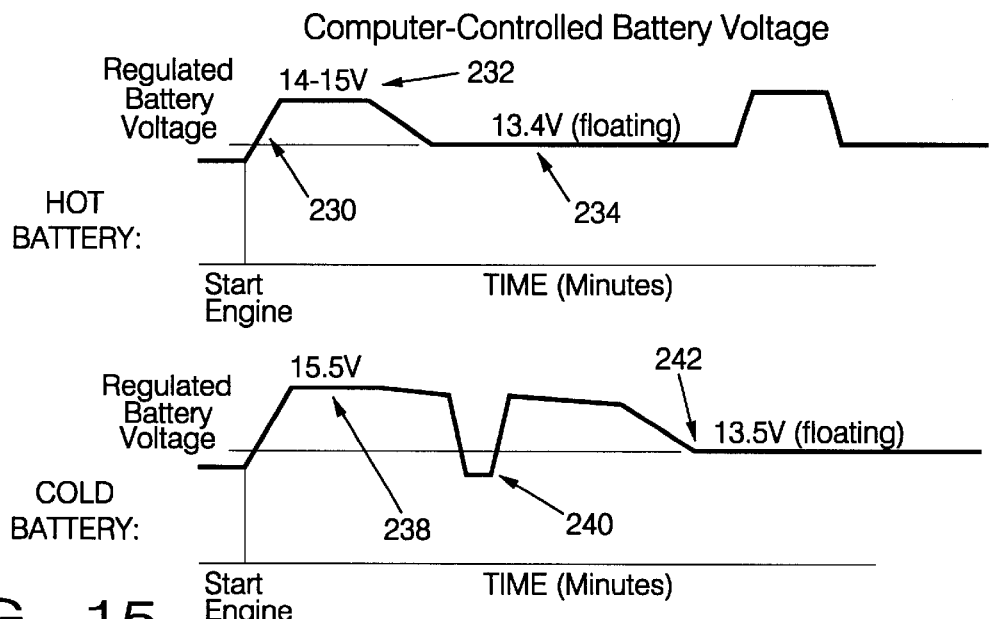
FIG. 15

METHOD AND SYSTEM FOR REGULATING A CHARGE VOLTAGE DELIVERED TO A BATTERY

FIELD OF THE INVENTION

The present invention relates to a charging system for recharging a battery in an automobile and, more particularly, to a system for regulating a charge voltage delivered to a battery in an automobile.

BACKGROUND OF THE INVENTION

An automobile battery is an electrochemical device that produces and stores electricity. Typically, an automobile battery is a "12-volt" direct-current (DC) battery which actually produces approximately 12.6 volts of electricity. Such a 12-volt battery generally includes a series of six elements or cells wherein each cell produces approximately 2.1 volts. Each cell generally includes a container wherein a positive plate and a negative plate are situated separate from each other and covered within a bath of electrolyte. The electrolyte, often referred to as "battery acid," is generally a mixture of distilled water and sulfuric acid.

When a driver inserts and turns a key in the ignition of an automobile, the electric starting motor of the automobile starting system draws electrical power (electric current) from the battery and converts that electrical power into mechanical power to crank and start up the engine. In doing so, the battery is discharged (electrically weakened) to some degree due to the electric current flow out of the battery. As a result, the battery must at some time be recharged to ensure that the automobile can be successfully started up again in the future.

To recharge the battery, the automobile includes a charging system. The charging system in a modern automobile typically includes (1) a generator (also known as an alternator), (2) a generator drive belt, (3) a voltage regulator, (4) a charge indicator, and (5) a charging system harness. The generator is a DC (direct current) generator that converts mechanical power from the engine into electrical power such as an electric voltage and current. This electrical power is communicated from an output terminal of the generator to the battery to thereby recharge the battery. The generator drive belt, on the other hand, serves to couple the crankshaft pulley on the engine to a drive pulley on the generator, thereby transferring mechanical power from the engine to the generator. Further, the voltage regulator, a very important and key element in the charging system of an automobile, is an electrical device that dictates, controls, and regulates the levels of the output voltage and current produced by the generator for recharging the battery. In addition, the charge indicator is generally a visual indicator which visually communicates to a driver the operational health of the charging system and/or the battery. The charge indicator may include, for example, a warning light, with or without a voltmeter indicator or an ammeter indicator, visibly situated in the dash, instrument panel, or driver information center (DIC) of the automobile. Lastly, the charging system harness is a wire harness that contains the many wires that are electrically interconnected between the various parts and elements of the charging system.

Once the engine is started up with the starting system and successfully running, the charging system then takes over to provide electric current to the battery as well as provide electric current to the electrical systems and many various electrical loads associated therewith within the automobile. More particularly, when the engine is started up and running, the spinning crankshaft pulley on the engine then motivates the generator drive belt to mechanically spin the drive pulley on the generator. In this way, the generator is able to use the mechanical action of the drive pulley to generate and produce an electric current at the generator output terminal. This electric current produced and output by the generator is utilized to both recharge the battery and operate the electrical systems and various electrical loads associated therewith within the automobile when the engine is running. Some of the various electrical loads may include, for example, front and rear HVAC (heating, ventilation, and air-conditioning) blowers, an AC (air-conditioning) compressor clutch, front and rear heated seats, heated mirrors, a rear window defogger, a rear window wiper, courtesy door lights, interior lights, engine cooling fans, etc.

While the engine is running, the voltage regulator of the charging system works to both generally maintain and vary the output voltage of the generator within a predetermined optimum voltage range, such as, for example, 13 to 16 volts. By maintaining the generator output voltage within such a voltage range, electric current from the generator is, first of all, thereby driven into the battery to successfully recharge the battery since the voltage range is higher than the inherent voltage level (12.6 volts) of the battery. In addition, maintaining the generator output voltage within such a range also enables the generator to simultaneously supply electric current and voltage power to the many different electrical systems and various electrical loads within the automobile for their proper operation as well. Furthermore, by working to maintain the generator output voltage within an optimum voltage range in this way, the voltage regulator also thereby prevents the problems commonly associated with undercharging or overcharging the battery. For example, if the battery is undercharged, then the likelihood that the battery will not be able to successfully crank and start up the automobile again in the future is undesirably increased. On the other hand, if the battery is overcharged, then the battery may overheat or experience "gassing" (the formation of acid fumes within the battery) and become permanently damaged.

In addition to merely maintaining the generator output voltage within an optimum voltage range, an ideal voltage regulator must also precisely vary the generator output voltage within the optimum voltage range to accommodate abrupt changes in operating conditions concerning the battery, the engine, and the various electrical loads within the automobile. In doing so, the voltage regulator thereby attempts to both conserve battery life and improve the overall fuel economy of the automobile. For example, with regard to the battery, to ensure that the battery is fully recharged while the engine is running and before the ignition and engine are turned off, an ideal voltage regulator will dictate that the generator produce an output voltage near the high end of the optimum voltage range when the engine is initially started up and running. In this way, if the engine is only turned on for a brief period of time, for example, when the automobile is used for a very brief trip, the battery is successfully recharged before the engine is turned off. Once, however, the battery is fully recharged while the engine is running, the voltage regulator will reduce the generator output voltage so that the output voltage settles at or near the low end of the optimum voltage range. In doing so, the voltage regulator helps prevent overcharging and gassing, preserve battery life, preserve the lives of headlights and other various lights, within the automobile, and improve the overall fuel economy of the automobile. As another example, if the automobile is idling in extremely slow traffic with numerous electrical loads activated and thereby heavily discharging the battery, an ideal voltage regulator will quickly dictate that the generator output voltage be set near the upper end of the optimum voltage range once the automobile breaks free from traffic and travels at a higher rate of speed on the open road to ensure that the battery is fully recharged before the engine is turned off. Once the battery is fully recharged in this way, the voltage regulator will then dictate that the generator output voltage be reduced and settle back down at or near the lower end of the optimum voltage range. As these examples illustrate, an ideal voltage regulator should timely and precisely dictate the output voltage of the generator to prevent the battery from being undercharged, wherein the battery will not be able to restart the car in the future, and to prevent the battery from being overcharged, wherein undesired overheating or gassing of the battery will occur. Again, in doing so, the voltage regulator thereby helps preserve battery life, as well as the life of various lamps (i.e., lights) and other electrical components within the automobile, and helps improve the overall fuel economy of the automobile. Although the voltage regulators within many modern automobiles attempt with some measure of success in achieving some of these goals, there is yet to date much room for needed improvement.

For the voltage regulator to be able to timely and precisely adjust and dictate the output voltage of the generator to successfully recharge and maintain the battery at a proper charge level at all times, an ideal voltage regulator must, on an ongoing periodic basis, obtain and consider up to date information regarding both (1) the everchanging temperature of the battery and (2) the everchanging "state of charge" (SOC) of the battery. For example, with regard to temperature, if the temperature of the electrolyte within the battery (hereinafter the "battery temperature") is very low due to cold weather, the chemical action of the battery is slowed such that the battery requires a higher voltage to be recharged than it would have required had the battery temperature been higher. In such a case, the voltage regulator must estimate the battery temperature so that the voltage regulator may, for an appropriate period of time, determine and dictate an appropriate generator output voltage at or near the upper end of the optimum voltage range which will sufficiently charge the battery and/or operate the electrical systems and thereby overcome the adverse effect of the cold temperature. In contrast, if the battery temperature is very high, the chemical action of the electrolyte within the battery is no longer slowed. In such a case, the voltage regulator must estimate the battery temperature and recognize the situation as such so that an appropriate generator output voltage can be determined and dictated that will successfully recharge the battery and/or operate the electrical systems without causing overheating or gassing within the battery. On the other hand, with regard to the state of charge of the battery, if the state of charge of the battery is low (that is, the battery is electrically weak due to discharging), then the voltage regulator must estimate the state of charge of the battery to determine the extent and particular degree of the battery's weakened condition. In doing so, the voltage regulator can then precisely adjust the output voltage of the generator upward and thereby successfully recharge the battery to a proper charge level and/or operate the electrical systems without undercharging or overcharging the battery. In contrast, if the state of charge of the battery is high, then the voltage regulator must estimate the state of charge of the battery to recognize the situation as such so that an appropriate generator output voltage can be determined and dictated that will successfully recharge the battery and/or operate the electrical systems without undercharging or overcharging the battery.

In known prior art charging systems, the voltage regulators included therein often utilize a temperature sensor, such as a thermistor, which is situated on or proximate the battery (for example, within the battery tray) and connected to a "sense" or "sensing" terminal (often referred to as an S-terminal) of the generator with one or more wires to periodically estimate the temperature of the battery. In addition, such voltage regulators also often utilize an integrated circuit (IC) which is installed at the battery and connected to the voltage regulator with one or more wires to periodically sense the current state of charge of the battery. In such a configuration, the voltage regulators of such known prior art charging systems gather information about both the temperature of the battery and the state of charge of the battery in an attempt to timely and precisely adjust the output voltage of the generator to help ensure that the battery is properly charged. However, using such means for periodically monitoring both the temperature and state of charge of the battery are typically very expensive, for such requires a significant amount of extra wiring and additional electronic components.

Thus, in light of the above, there is a present need in the art for a method and/or system for regulating a charge voltage delivered from a generator and to a battery which (1) successfully and accurately monitors both the temperature and the state of charge of the battery, (2) timely and precisely adjusts the generator output voltage to prevent undercharging and overcharging as well as gassing in the battery, (3) improves battery life, the life of various lights within the automobile, and overall automobile fuel economy, and (4) accomplishes (1), (2), and (3) with a minimal amount of wiring and electronic components to thereby reduce production costs.

SUMMARY OF THE INVENTION

The present invention provides a method of regulating a charge voltage delivered to a battery in an automobile that has an engine and an ignition system capable of being activated with an ignition switch. The method successfully extends the life of the battery and also helps improve the overall fuel economy of the automobile. According to the present invention, the method basically includes, first of all, the steps of periodically estimating the electrolyte temperature of the battery when the ignition switch is on, periodically sensing the voltage of the battery when the ignition switch is on, and using the estimated electrolyte temperature and the sensed voltage to estimate the electric current of the battery. In addition, the method also basically includes the steps of using the estimated electric current to estimate the amp-hours into the battery, using the estimated amp-hours to estimate the state of charge of the battery when the engine is running, and using the running state of charge and the estimated electrolyte temperature to determine an optimum charge voltage for the battery. Furthermore, the method also basically includes the steps of using the sensed voltage to adjust the optimum charge voltage, communicating the optimum charge voltage to a generator, and using the generator to deliver a charge voltage to the battery wherein the charge voltage is regulated by the optimum charge voltage.

In a preferred methodology of the present invention, the method also includes the steps of periodically sensing the open-circuit voltage of the battery when the ignition switch is off, using the sensed open-circuit voltage and the estimated electrolyte temperature to estimate the state of charge of the battery when the ignition switch is initially turned on for starting up the engine, and also using the estimated start-up state of charge to estimate the state of charge of the battery when the engine is running. In a highly preferred methodology of the present invention, the method also includes the step of determining the length of time that the ignition switch was off when the ignition switch is initially turned on and the step of using the sensed open-circuit voltage and the estimated electrolyte temperature to estimate the start-up state of charge of the battery only when the length of time that the ignition switch was off is greater than a predetermined rest time for the battery. The predetermined rest time for the battery is preferably selected from a range of only a couple of hours to several hours.

Also, in a preferred methodology of the present invention, the basic step of periodically estimating the electrolyte temperature of the battery when the ignition switch is on preferably includes the step of sensing the temperature of the air entering into the engine. Sensing the temperature of the air entering into the engine is preferably accomplished with an intake air temperature sensor situated on the engine.

Further, in a preferred methodology of the present invention, the method also includes the step of using the running state of charge and the estimated amp-hours to determine an appropriate boost level of the idle speed of the engine. In addition, the method also preferably includes the step of using the running state of charge and the estimated amp-hours to determine an appropriate reduction or shed level of various electrical loads on the vehicle. Such various electrical loads may include, for example, front and rear HVAC blowers, an air-conditioning compressor clutch, front and rear heated seats, heated mirrors, a rear window defogger, a rear window wiper, door lights, interior lights, engine cooling fans, etc.

To implement the method described hereinabove, the present invention also provides a system for regulating a charge voltage delivered to a battery in an automobile having an engine. According to the present invention, the system basically includes, first of all, a generator and an engine control module. The generator has an output terminal capable of being electrically connected to the battery for delivering a charge voltage to the battery. The engine control module is electrically connected to the generator and is capable of sensing an electric feedback signal from the generator. In addition, the system also basically includes a sensor capable of sensing the temperature of the air entering into the engine, an actuator capable of adjusting the idle speed of the engine, and a data link. The air temperature sensor, the idle speed actuator, and the data link are all electrically connected to the engine control module. Furthermore, the system also basically includes a body control module electrically connected to the data link, a plurality of body controllers also electrically connected to the data link, and a plurality of electrical loads electrically connected to the body controllers. The body control module is capable of being electrically connected to the battery and has means for sensing the voltage of the battery. The electrical loads are capable of being powered by the generator and/or the battery. In such a configuration, the body control module is capable of using the sensed electric feedback signal, the sensed air temperature, and the sensed battery voltage to determine an optimum charge voltage for the battery, adjust the idle speed of the engine, and selectively reduce or shed the electrical loads. The engine control module is capable of communicating the optimum charge voltage to the generator such that the generator is capable of delivering a charge voltage to the battery which is regulated by the optimum charge voltage.

In a preferred embodiment of the present invention, the system also includes a driver information center (DIC) electrically connected to the data link. The DIC serves to visually and/or audibly convey operational information concerning the automobile to a human driver. Furthermore, the system also preferably includes a data link connector electrically connected to the data link. The data link connector provides electrical access to information on the data link so that diagnostic testing can be performed by a technician.

Advantages, design considerations, and applications of the present invention will become apparent to those skilled in the art when the detailed description of the best mode contemplated for practicing the invention, as set forth hereinbelow, is read in conjunction with the following drawings.

BRIEF DESCRIPTION OF THE DRAWINGS

A preferred, exemplary embodiment of the present invention will be described hereinbelow with reference to the following drawings.

FIG. 10 is a look-up table used to obtain a value for the state of charge of a battery at engine start-up.

FIG. 11 is an example of a graph used for estimating the electric current of a battery.

FIG. 12 is a plotted chart used for determining the optimum charge voltage of a battery.

FIG. 13 is a table illustrating how an electric duty cycle signal relates to an adjusted value for the optimum charge voltage for a battery.

FIG. 15 is a plotted comparison between the regulated charge voltage delivered to a hot battery during operation and the regulated charge voltage delivered to a cold battery during operation.

DETAILED DESCRIPTION OF THE PREFERRED EMBODIMENT

The present invention provides a method of regulating a charge voltage delivered to a battery in an automobile that has an engine and an ignition system capable of being activated with an ignition switch. The method when implemented, successfully and accurately monitors both the temperature and the state of charge of the battery, timely and precisely adjusts the output voltage of a generator to prevent undercharging and overcharging as well as gassing in the battery, improves battery life and the life of various lights within the automobile, and improves overall automobile fuel economy. To implement the method, the present invention also provides a system for regulating a charge voltage delivered to a battery in an automobile. The system requires only a minimal amount of wiring and electronic components and thereby helps reduce the production costs associated therewith.

Both the preferred structure and the preferred operation of the present invention are described in detail hereinbelow.

I. Preferred Structure of the Invention

Figure 1:
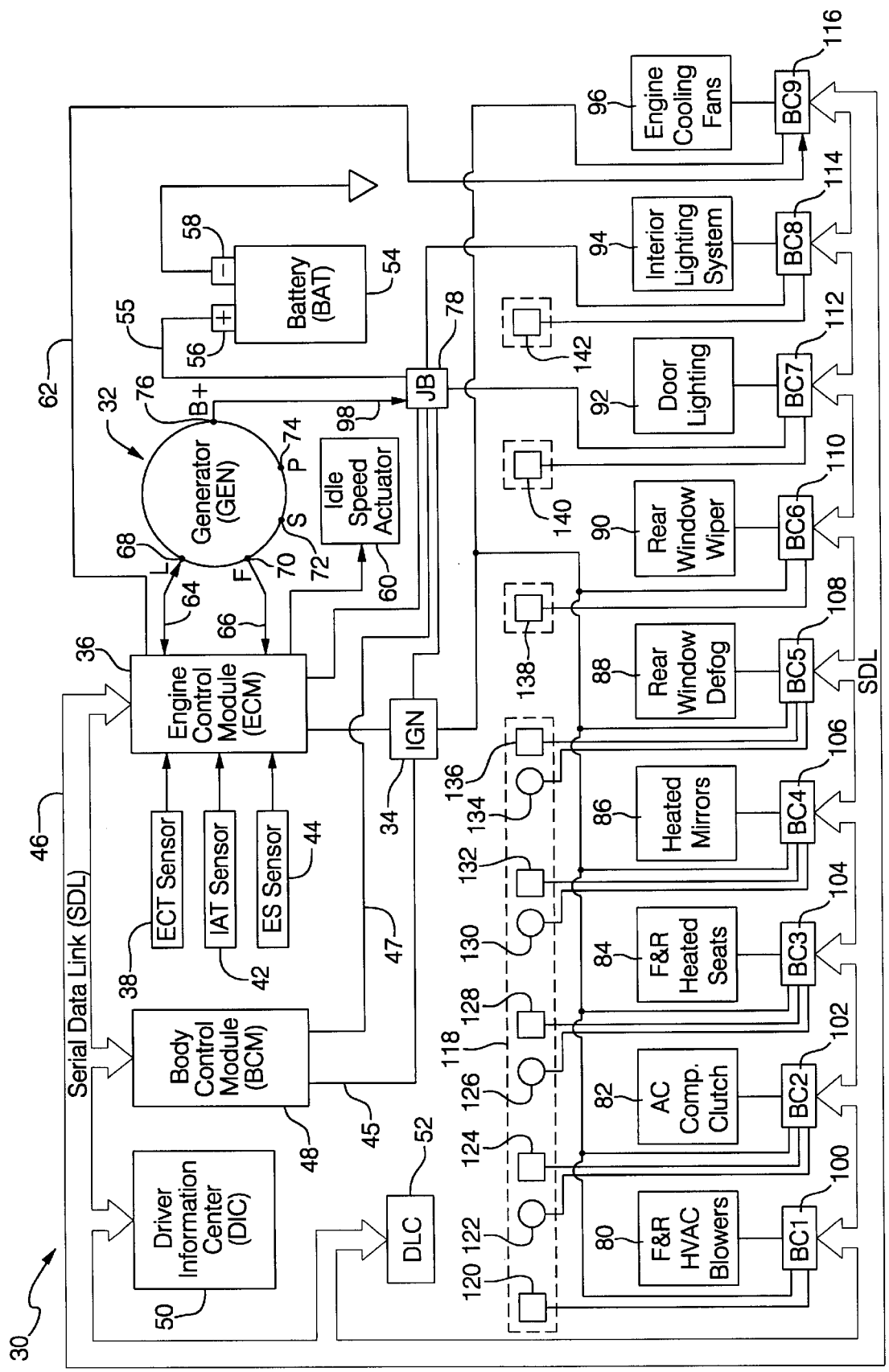
FIG. 1 is an electrical circuit and block diagram illustrating a system for regulating a charge voltage delivered to a battery in an automobile having an engine, wherein electrical connections between a body control module, an engine control module, an ignition system, a generator, a battery, and various electrical loads are highlighted.

In FIG. 1, a preferred embodiment of a system 30 for regulating a charge voltage delivered to a 12-volt battery 54 in an automobile having an engine is illustrated. The system 30 primarily includes a generator (GEN) 32, an ignition (IGN) system 34, an engine control module (ECM) 36, a body control module (BCM) 48, and a data link 46. The generator 32 in this particular embodiment has at least five electrical connection terminals. These terminals include an L-terminal 68, a "field" duty cycle monitor terminal or F-terminal 70, a "sense" or S-terminal 72, a P-terminal 74, and an "output" terminal (B+) 76. The L-terminal 68 is electrically connected to the ECM 36 via an electrical conductor 64. The ECM 36 uses the conductor 64 to communicate a determined optimum charge voltage in the form of an electrical pulse width modulation (PWM) signal to the L-terminal 68 of the generator 32. Similarly, the F-terminal 70 is electrically connected to the ECM 36 via an electrical conductor 66 as well. The ECM 36 uses the conductor 66 to receive electric feedback signals from the generator 32. In contrast to the L-terminal 68 and the F-terminal 70, both the S-terminal 72 and the P-terminal 74 of the generator 32 remain electrically disconnected in this embodiment of the present invention. As alluded to earlier herein, given that known prior art charging systems often include a temperature-sensing thermistor electrically connected to an S-terminal to help estimate battery temperature, the fact that the generator 32 within the system 30 of the present invention has an S-terminal 72 which is electrically disconnected thereby demonstrates, at least in part, that the system 30 of the present invention requires only a minimal amount of wiring and electrical components. Lastly, the output terminal 76 of the generator 32 is electrically connected to a positive terminal 56 of the battery 54 via an electrical conductor 98, an electrical junction block or box (JB) 78, and an electrical conductor 55. A negative terminal 58 of the battery 54 is electrically connected to, for example, a chassis ground. The generator 32 uses the output terminal 76 to deliver an electric optimum charge voltage to the battery 54 for recharging the battery 54.

The ignition system 34 of the system 30 is electrically connected between the battery 54, via the junction box 78, and both the ECM 36 and the BCM 48. The ignition system 34 serves to enable a driver to selectively turn the spark ignition engine (not shown) associated with the system 30 either on or off by placing and turning a key within an ignition switch included within the ignition system 34. The ignition system 34 is made operable by an electric voltage supplied by either the generator 32 or the battery 54 via the junction box 78. When the ignition switch is turned to a closed or "key-on" position, the engine is spark-ignited and turned on such that electric signals are communicated from the ignition system 34 to both the ECM 36 and the BCM 48, thereby fully activating the system 30. On the other hand, when the ignition switch is turned to an open or "key-off" position, the engine is turned off and electric signals are generally no longer communicated from the ignition system 34 to both the ECM 36 and the BCM 48. As a result, the system 30 is, for the most part, deactivated when the ignition switch is in the key-off position.

The engine control module (ECM) 36, in addition to being electrically connected to both the generator 32 and the ignition system 34, is also electrically connected to an engine coolant temperature (ECT) sensor 38, an intake air temperature (IAT) sensor 42, an engine speed (ES) sensor 44, an idle speed actuator 60, and the battery 54. The ECT sensor 38 measures the temperature of engine coolant and periodically communicates coolant temperature information to the ECM 36. Based on such information, if the ECM 36 determines that the coolant temperature is undesirably high, then the ECM 36 will directly activate engine cooling fans 96 via an electrical conductor 62 to thereby cool down the engine. The IAT sensor 42, sometimes also referred to as a manifold air temperature (MAT) sensor, measures the temperature of intake air as the air enters the intake manifold of the engine. The IAT sensor 42 is used in the system 30 to help estimate the temperature of the battery 54. The IAT sensor 42 may include, for example, a temperature-sensitive thermistor situated at the intake manifold of the engine. The ES sensor 44 measures the revolutions per minute (rpm's) of the engine for ensuring proper operation of the ignition system 34. The ES sensor 44 may, for example, be located next to the crankshaft or camshaft. Further, the idle speed actuator 60 is used by the ECM 36 to adjust and thereby either boost or unboost the idle speed of the engine. The idle speed actuator 60 may include, for example, a tiny electric motor and gear mechanism that holds a carburetor throttle lever in a desired position. Lastly, the ECM 36 is electrically connected to the battery 54, as well as to the output terminal 76 of the generator 32, via the junction box 78. In this way, the ECM 36 is made operable by an electric voltage supplied by either the generator 32 or the battery 54 via the junction box 78.

The body control module (BCM) 48 is the primary processing means in the present invention for implementing many of the various method steps necessary for regulating a charge voltage delivered to the battery 54. In a highly preferred embodiment, the BCM 48 may include as many as 6 kilobytes of program "read only" memory (ROM), 250 bytes of "random access" memory (RAM), and 200 bytes of an electrically programmable ROM (EEPROM). The BCM 48 is electrically connected, first of all, to the ignition system 34. Thus, when the ignition switch of the ignition system 34 is switched into the key-on position, the BCM 48 receives an electric signal from the ignition system 34 via an electrical conductor 45, thereby fully activating the BCM 48. On the other hand, when the ignition switch of the ignition system 34 is switched into a key-off position, then generally no electric signal is received by the BCM 48 from the ignition system 34. As a result, the BCM 48 is, at least for the most part, deactivated. In addition, the BCM 48 is also electrically connected to the battery 54 via an electrical conductor 47, the junction box 78, and the conductor 55. This connection between the BCM 48 and the battery 54 enables the BCM 48 to periodically sense the voltage level of the battery 54 to help the BCM 48 estimate the state of charge of the battery 54. Although the BCM 48 primarily and more frequently senses the voltage level of the battery 54 when the ignition switch of the ignition system 34 is in a key-on position, the BCM 48 does periodically sense the voltage level of the battery 54 even when the ignition switch is in a key-off position, but it does so much more infrequently when the ignition switch is in the key-off position as will be explained later herein.

The data link 46, in the particular embodiment illustrated in FIG. 1, is preferably a serial-type data link (SDL). The SDL 46 is used as an informational "bus" for conveying electric control signals, software variable values, and various types of data between many of the elements comprising the system 30 which are connected to the SDL 46. As illustrated in FIG. 1, both the ECM 36 and the BCM 48 are electrically connected to the SDL 46 and are thereby able to communicate and share information with each other through the SDL 46.

In addition to the ECM 36 and the BCM 48, a plurality of body controllers (BC's) 100, 102, 104, 106, 108, 110, 112, 114, and 116 are also connected to the SDL 46. The body controllers are electrically connected to and individually control a plurality of electrical loads which are operable device features situated in the automobile in which the system 30 is included. In the particular embodiment illustrated in FIG. 1, the electrical loads include front and rear HVAC blowers 80, an AC compressor clutch 82, front and rear heated seats 84, heated mirrors 86, a rear window defogger (or defroster) 88, a rear window wiper 90, courtesy door lights 92, interior lights 94, and engine cooling fans 96. With regard to all but the engine cooling fans 96, these electrical loads are selectively activatable by a driver or passenger with manual controls (such as a button or rotatable dial) 120, 124, 128, 132, 136, 138, 140, and 142. The engine cooling fans 96, as explained hereinabove, are not selectively activatable by a human and are instead primarily activatable by the ECM 36 via conductor 62. Special visual indicators (such as small lights) 122, 126, 130, and 134 electrically associated with the AC compressor clutch 82, the front and rear heated seats 84, the heated mirrors 86, and the rear window defogger 88 are provided and situated, for example, collectively in an instrument panel 118 in the dash of the automobile to visually indicate to a driver or passenger whether these subtle operating device features are activated or deactivated. As illustrated in FIG. 1, the front and rear HVAC blowers 80, the AC compressor clutch 82, the front and rear heated seats 84, the heated mirrors 86, the rear window defogger 88, the rear window wiper 90, and the engine cooling fans 96 are all electrically powered by either the generator 32 or the battery 54 via the junction box 78 and the ignition system 34. Thus, these particular electrical loads generally are only operable when the ignition switch of the ignition system 34 is in a key-on position. In contrast, the door lights 92 and the interior lights 94 are electrically powered by either the generator 32 or the battery 54 via the junction box 78. Thus, these two particular electrical loads generally are operable regardless of whether the ignition switch of the ignition system 34 is in a key-on position or a key-off position.

Further, in addition to the ECM 36, the BCM 48, and the body controllers with their associated electrical loads, a driver information center (DIC) 50 is also electrically connected to the SDL 46. The DIC 50 is a dash-mounted keyboard with a small digital display and/or a small speaker from which operational information and related data can be requested and obtained by a driver or passenger. For example, on the digital display, the DIC 50 may visibly display digital numbers or notification messages concerning average fuel consumption, fuel level, miles-to-empty, trip mileage, estimated time of arrival, engine temperature, oil pressure, oil level, engine speed, vehicle speed, the temperature of the battery 54, the voltage level of the battery 54, etc. In addition, the DIC 50 may also include one or more problem-specific malfunction indicator lights (MIL's). For example, a MIL may illuminate when the charging system malfunctions, the temperature of the battery 54 is undesirably high, or the voltage level of the battery 54 is undesirably low. In general, such information provided by the DIC 50 is derived from many different sensors monitoring the many different systems within the automobile. These sensors may include, for example, the ECT sensor 38, the AAT sensor 40, the IAT sensor 42, and the ES sensor 44 among others. The electric signals generated by these sensors are electrically communicated to the ECM 36 where the ECM 36 converts the signals into data signals suitable for transfer to the BCM 48 and/or the DIC 50 via the SDL 46. In this way, operational information and related data derived from the sensors is ultimately made available to an observing driver via the DIC 50. Furthermore, in addition to the digital display, the small speaker in the DIC 50 may also provide one or more different audible indicators that convey operational information to a listening driver. For example, the speaker may emit problem-specific audible warning chimes, warning buzzers, or even spoken warning messages such as "check your brake fluid" or "check your battery."

Lastly, a data link connector (DLC) 52 is also electrically connected to the SDL 46. The DLC 52, sometimes referred to as a "diagnostic connector" or even an "assembly line diagnostic link (ALDL)," is a multi-pin connector which can be connected to a scan tool (or diagnostic readout tool) by a service technician to retrieve, via the SDL 46, diagnostic trouble codes stored in memory by the ECM 36 and/or the BCM 48.

Figure 2:
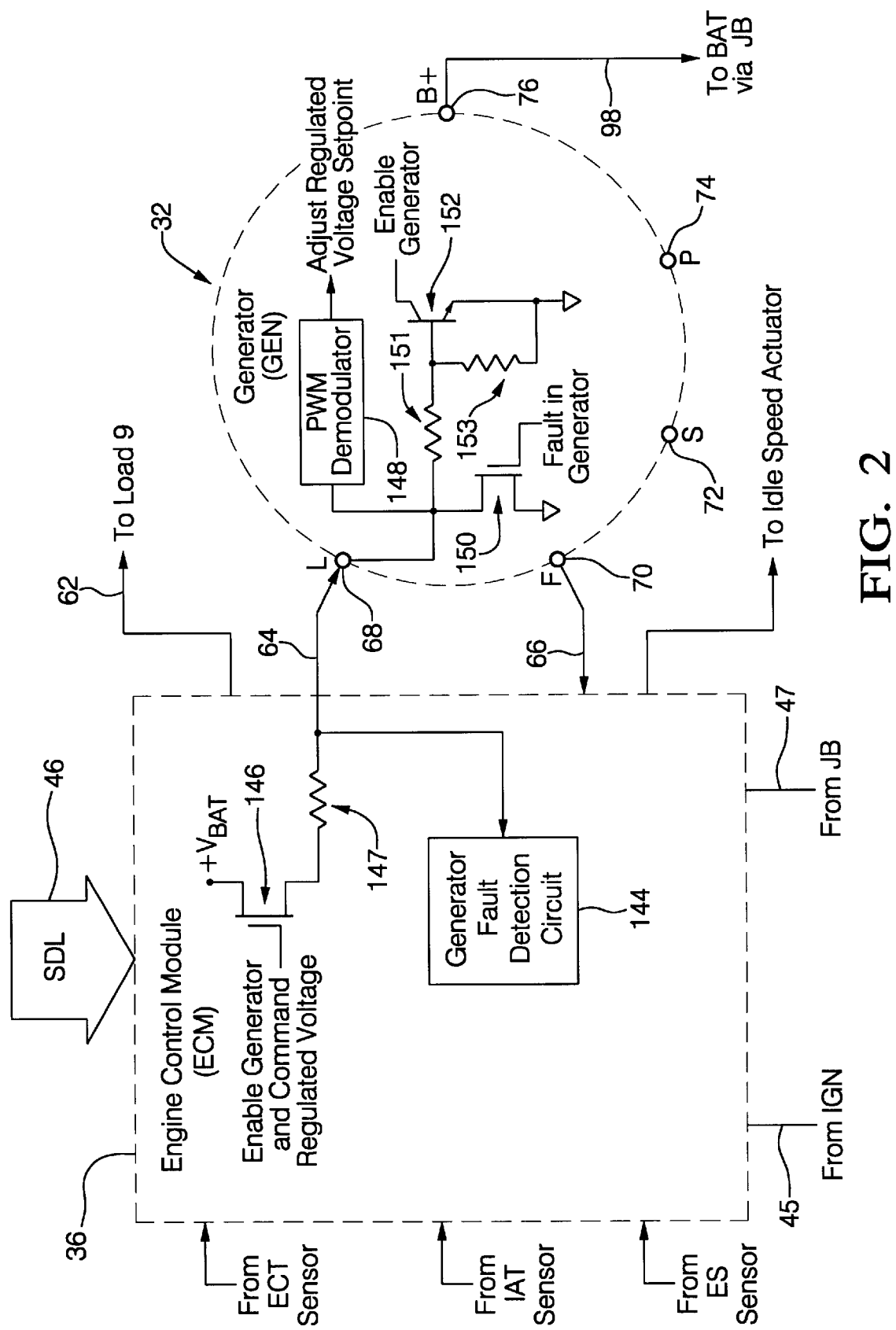
FIG. 2 is an electrical circuit and block diagram illustrating a generator fault detection circuit within the engine control module and highlighting electrical connections between the engine control module and the generator of FIG. 1.

In FIG. 2, electrical connections between the ECM 36 and the generator 32 are highlighted. Also, as particularly illustrated in FIG. 2, the ECM 36 includes both an N-channel field-effect transistor (FET) 146 and a fault detection circuit 144. Regarding the FET 146, the drain of the FET 146 is electrically connected to a voltage power source derived from the battery 54 which is electrically connected to the ECM 36 via the junction box 78, and the source of the FET 146 is electrically connected to the L-terminal 68 of the generator 32 via resistor 147 and the conductor 64. In such a configuration, the ECM 36 selectively applies electric signals to the gate of the FET 146 to both enable the generator 32 and generate electrical pulse width modulation (PWM) signals that communicate a determined optimum charge voltage to the L-terminal 68 of the generator 32. The fault detection circuit 144, on the other hand, is directly electrically connected to the L-terminal 68 of the generator 32. In such a configuration, if the voltage level at the L-terminal 68 ever drops low, the fault detection circuit 144 senses such and alerts the ECM 36 that the generator 32 is malfunctioning or is in an inoperative state.

Further, in FIG. 2, the generator 32 includes a PWM demodulator 148 electrically connected to the L-terminal 68 for helping convert the PWM signals communicated from the ECM 36 into a voltage upon which the generator output voltage produced at the output terminal 76 will be based. In addition to the PWM demodulator 148, the generator 32 also includes an NPN bipolar junction transistor (BJT) 152 and an N-channel field-effect transistor (FET) 150. Regarding the BJT 152, the base of the BJT 152 is electrically connected to the L-terminal 68 of the generator 32 via a resistor 151 and is also electrically connected to the electrically grounded emitter of the BJT 152 via a resistor 153. In such a configuration, whenever an electrical signal communicated by the ECM 36 to the L-terminal 68 of the generator 32 is high, the voltage level at the base of the BJT 152 then becomes high as well, and the BJT 152 will then slip into conduction mode and thereby permit current to pass from the collector to the emitter of the BJT 152. In doing so, the BJT 152 thereby enables the generator 32 for operation. When, on the other hand, the ECM 36 communicates a low or no electrical signal to the L-terminal 68, then the high voltage level previously established at the base of the BJT 152 is thereby reduced and eventually discharged altogether through the resistor 153. As a result, the BJT 152 slips into non-conduction mode and thereby causes the generator 32 to enter into a default mode. Furthermore, regarding the FET 150, the drain of the FET 150 is directly electrically connected to the L-terminal 68 of the generator 32, and the source of the FET 150 is electrically grounded. In such a configuration, if an operational malfunction or fault is determined to have occurred within the generator 32, then a high electrical signal is applied to the gate of the FET 150 such that the FET 150 slips into conduction mode. Whenever such occurs, any electrical signal communicated from the ECM 36 to the L-terminal 68 of the generator 32 is thereby electrically shorted to ground via the drain and source of the FET 150 and is thereby prevented from reaching both the PWM demodulator 148 and the base of the BJT 152. As a result, the BJT 152 eventually slips into non-conduction mode, thereby disabling operation of the generator 32, and any electrical signal communicated from the ECM 36 is thereby unable to be processed by the PWM demodulator 148. As a further result, since the FET 150 is in conduction mode, the L-terminal 68 is essentially electrically shorted to ground, thereby effectively reducing the voltage level at the L-terminal 68 to zero. When this occurs, the fault detection circuit 144 in the ECM 36 then senses the drop in the voltage level at the L-terminal 68 of the generator 32 and alerts the ECM 36 that the generator 32 is malfunctioning or is in an inoperative state.

Figure 3:
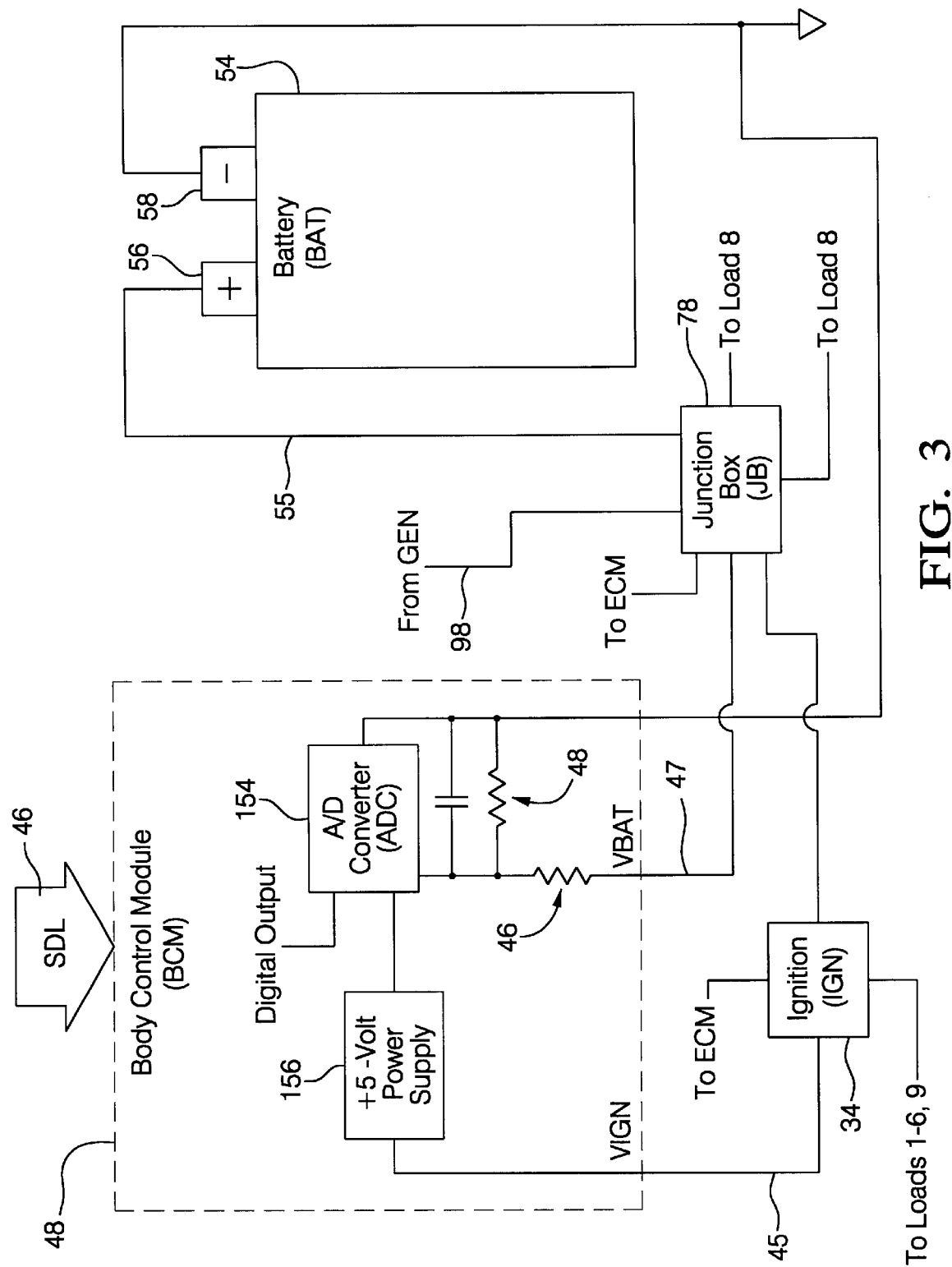
FIG. 3 is an electrical circuit and block diagram illustrating a battery voltage sensing circuit within the body control module and highlighting electrical connections between the body control module, the ignition system, and the battery of FIG. 1.

In FIG. 3, electrical connections between the BCM 48, the ignition system 34, the junction box 78, and the battery 54 are highlighted. Also, as particularly illustrated in FIG. 3, the BCM 48 includes an analog-to-digital (A/D) converter (ADC) 154 and a 5-volt DC reference power supply 156. The ADC 154 is used by the BCM 48 to periodically sense the voltage level of the battery 54 via the conductor 47, the junction box 78, and the conductor 55. In doing so, the ADC 154 assists the BCM 48 in obtaining voltage information that will enable the BCM 48 to estimate the state of charge of the battery 54. The ADC 154 is electrically powered by the 5-volt DC reference power supply 156. The 5 DC volts supplied to the ADC 154 by the reference power supply 156 is derived from one of either the output voltage of the generator 32 or the battery 54 as provided via the junction box 78, the ignition system 34, and the conductor 45.

This concludes the detailed description of the preferred structure of the present invention. It is to be understood, however, that the preferred structure as depicted in FIGS. 1 through 3 is somewhat simplified for the sake of clarity and is intended to facilitate a proper understanding of both the advantages and novel aspects of the present invention. Furthermore, it is to be understood that many other different electrical loads may be incorporated within the system 30 other than those particularly depicted in FIG. 1.

II. Preferred Operation of the Invention

In addition to the system 30, the present invention also provides a method 160 of regulating a charge voltage delivered to the battery 54. According to the present invention, the method 160 basically includes, first of all, the steps of periodically estimating the electrolyte temperature of the battery 54 when the ignition switch is on, periodically sensing the voltage of the battery 54 when the ignition switch is on, and using the estimated electrolyte temperature and the sensed voltage to estimate the electric current of the battery 54. In addition, the method also basically includes the steps of using the estimated electric current to estimate the amp-hours into or out of the battery 54, using the estimated amp-hours to estimate the state of charge (SOC) of the battery 54, and using the running state of charge and the estimated electrolyte temperature to determine an optimum charge voltage for the battery 54. Furthermore, the method also basically includes the steps of using the sensed voltage to adjust the optimum charge voltage, communicating the optimum charge voltage to the generator 32, and using the generator 32 to deliver a charge voltage to the battery 54 wherein the charge voltage is regulated by the optimum charge voltage.

Figure 4:
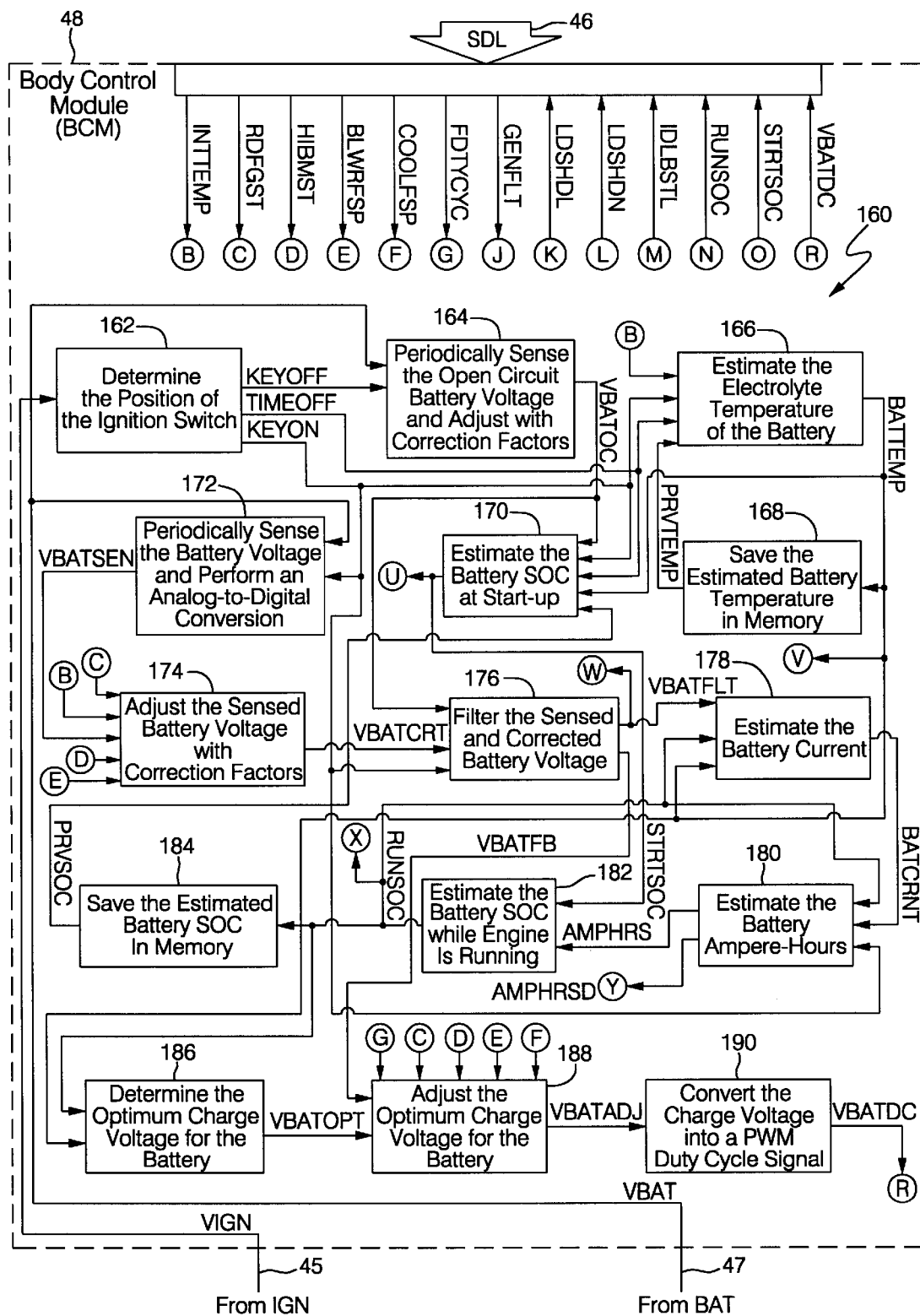
FIG. 4 is an electrical block diagram of the body control module in FIG. 1, wherein a software variables flow diagram for implementing a method of regulating a charge voltage delivered to the battery of FIG. 1 is illustrated.

A preferred and more detailed version of many of the steps included in the method 160 is set forth in FIG. 4, as will be discussed in detail hereinbelow. In general, FIG. 4 is an electrical block diagram of the body control module (BCM) 48 in FIG. 1. More particularly, however, FIG. 4 illustrates a control signals and software variables flow diagram for implementing the method 160 wherein many of the steps included in the method 160 are performed with the aid of software programs, routines, and algorithms which are executed within the BCM 48.

A. Determining the Position of the Ignition Switch

In FIGS. 1 and 4, when the ignition switch of the ignition system 34 is in a key-off position while the engine is off, a control signal VIGN associated with the voltage potential on the conductor 45, electrically connected between the ignition system 34 and the BCM 48, will be low. In such a state, a control signal (or flag variable) KEYOFF within the BCM 48 will be high, thereby indicating that the ignition switch is in a key-off position. In addition, however, a control signal (or flag variable) KEYON within the BCM 48 will be low.

On the other hand, when the ignition switch of the ignition system 34 is manipulated into a key-on position during engine start-up, VIGN in the BCM 48 will go high, and KEYON will go high as well, thereby indicating that the ignition switch is in a key-on position. However, KEYOFF will suddenly go low when the ignition switch is manipulated into the key-on position and when VIGN goes high. When such occurs, the BCM 48 will then determine a value for a calculable variable TIMEOFF which represents the actual length of time that the engine was turned off before start-up.

In sum, the BCM 48, in general, senses the voltage level on the conductor 45 to determine whether the ignition switch of the ignition system 34 is in the key-on position or the key-off position. Based on the position of the ignition switch, the BCM 48 then determines the appropriate control signals and/or variable values for KEYOFF, TIMEOFF, and KEYON as depicted by flow diagram box 162 in FIG. 4.

B. Periodically Sensing the Open-Circuit Voltage of the Battery During Key-off

When the ignition switch of the ignition system 34 is in a key-off position and the engine is off, the BCM 48 will periodically "wake up" once every $X_1$ hours (wherein $X_1$ represents a predetermined number of hours) to sense and determine the open-circuit voltage (OCV) of the battery 54 represented by calculable variable VBATOC. In general, each value for VBATOC is derived from the voltage potential VBAT which is sensed, via the ADC 154, on the conductor 47 electrically connected between the BCM 48 and the junction box 78. Once the voltage potential VBAT is sensed, the value for VBAT is adjusted with correction factors related to, for example, the production variance, temperature variance, and voltage variance inherently associated with the ADC 154 to ultimately determine a value for VBATOC. Each sensed and determined value for VBATOC is stored and later overwritten by subsequent values in a memory within the BCM 48. After the engine has been off for $X_2$ hours (wherein $X_2$ is a predetermined number of hours greater than $X_1$), the wake-up frequency of the BCM 48 is then decreased from once every $X_1$ hours to once every $X_3$ hours (wherein $X_3$ is a predetermined number of hours greater than $X_2$) to minimize the electric current drain on the battery 54. Also, to help eliminate or filter out electrical noise during open-circuit voltage readings, each value for VBATOC is determined from, for example, the average of four to eight or more quick sequential 500 milliseconds readings.

By measuring the open-circuit voltage of the battery 54 when the ignition switch is in a key-off position, the absolute value of the state of charge of the battery 54 can thereby be better estimated since the open-circuit voltage of the battery 54 is directly proportional to the actual state of charge of the battery 54 for a given temperature. For purposes of this discussion, the term "open-circuit voltage" is defined as the sensed voltage of the battery 54 during key-off when the battery 54 is merely burdened with a light parasitic electrical load to no load at all. Also, for general purposes of this discussion, the term "state of charge" (SOC) is generally defined, for example, as the remaining electrical capacity (in amp-hours) in the battery 54, divided by the maximum rated capacity of the battery 54, which is measured at a constant current for a 20-hour discharge at 25° C. That is, all state of charge calculations discussed herein are referenced to a C20-rate capacity, wherein a "C20-rate capacity" is a measurement of how much current the battery 54 can produce for 20 hours at approximately room temperature (for example, at about 25° C.) with the voltage of the battery 54 remaining at a level of at least 10.5 volts.

This step of periodically sensing the open-circuit voltage of the battery 54 during key-off is depicted in FIG. 4 by flow diagram box 164.

C. Estimating the State of Charge of the Battery at Start-up During Key-on

When the ignition switch of the ignition system 34 is suddenly switched from a key-off position to a key-on position, the BCM 48 shall calculate a value for TIMEOFF and then determine if the value for TIMEOFF is greater than or equal to a rest time TEsr for the battery 54, wherein TReST is a predetermined number of hours ranging from only about a couple of hours to several hours. If the value for TIMEOFF is equal to or greater than the rest time of the battery 54, then an estimated value for the start-up state of charge of the battery 54, represented by calculable variable STRTSOC, is obtained from a look-up table such as the table depicted in FIG. 10. In particular, the voltage values included in the look-up table are based upon the most recent value for VBATOC stored (during key-off) in memory by the BCM 48, and the temperature values included in the table are based upon the temperature of the battery 54, represented by calculable variable BATTEMP, which is immediately estimated when the ignition switch is suddenly moved from the key-off position to the key-on position at engine start-up. Once the values for the look-up table are fully established upon start-up, a value for STRTSOC is quickly determined from the table data through interpolation and is thereafter stored in memory within the BCM 48.

If, on the other hand, the value for TIMEOFF is less than the predetermined rest time of the battery 54, then the value for STRTSOC shall be made equal to the last value estimated for the state of charge of the battery 54 while the engine was last running with the ignition switch in the key-on position. This last value for the estimated last running state of charge of the battery 54, represented by calculable variable PRVSOC, was saved in a non-volatile memory within the BCM 48 just before the ignition switch was last turned off. See flow diagram box 184 in FIG. 4.

This step of estimating the state of charge of the battery 54 at start-up during key-on is depicted in FIG. 4 by flow diagram box 170.

D. Periodically Sensing the Voltage of the Battery During Key-on

In general, when the ignition switch of the ignition system 34 is in the key-on position, the BCM 48 periodically senses the voltage of the battery 54 to thereby estimate the state of charge of the battery 54 especially, although not necessarily exclusively, while the engine is running. In particular, the voltage potential VBAT on the conductor 47 is periodically sensed by the BCM 48 with the ADC 154 as illustrated in FIG. 3. The sensed voltage potential is stored in memory within the BCM 48 as measured variable VBATSEN.

If the BCM 48 is not able to successfully sense a value for VBATSEN, for example, if conductor 47 breaks apart due to corrosion, then the BCM 48 will send a trouble code warning to the DIC 50 via the SDL 46 to thereby alert a driver or passenger that there is an operational problem. In addition, the BCM 48 will also attempt, as a last resort, to derive a value for VBATSEN based on either the voltage potential of VIGN on the conductor 45 connected to the ignition system 34 or the voltage potential on any other power line (not shown) connected to the BCM 48 that provides voltage power from the battery 54.

This step of periodically sensing the voltage of the battery 54 during key-on is depicted in FIG. 4 by flow diagram box 172.

E. Adjusting the Sensed Battery Voltage with Correction Factors

For the performance of the system 30 according to the present invention to be accurate, the periodic sensing of the voltage of the battery 54 must be accurate as well. In particular, when the battery 54 has a voltage potential within a particular voltage range and has a temperature within a particular temperature range, the BCM 48 should ideally be able to sense the voltage of the battery 54 within certain predetermined ranges of accuracy. To ensure that the value of the sensed voltage of the battery 54 does indeed fall within such accuracy ranges, the sensed battery voltage value VBATSEN is adjusted with multiple correction factors.

Some of these correction factors may include, for example, (1) the tolerances of resistors 46 and 48 associated with the ADC 154, (2) the resolution of the 5-volt DC reference power supply 156, (3) the production line variance in the ADC 154, (4) the temperature sensitivity of the ADC 154, (5) the voltage range sensitivity of the ADC 154, and (6) the voltage potential "line drop" between the battery 54 and the BCM 48 due to one or more electrical loads interposed between the battery 54 and the BCM 48 at, for example, the junction box 78. Actual numbers associated with and/or necessary for calculating these correction factors are pre-stored in a non-volatile read-only memory (ROM) within the BCM 48 for use in correcting voltage values sensed for the battery 54.

Regarding the third correction factor, a value to correct production line variance error inherent in the ADC 154, represented by the calculable variable V_ERR_ADC, can be determined from the equation $$V\_ERR\_ADC = K\_ERROR\_V, \quad (1)$$

wherein K_ERROR_V is an error voltage value determined at an end-of-line test on the production line of the BCM 48. The voltage error value for K_ERROR_V is stored and available in memory within the BCM 48. As a result, each time that the voltage of the battery 54 is sensed, the value for V_ERR_ADC is successfully used to negate any error in the value of the sensed voltage due to production line variance in the ADC 154.

Regarding the fourth correction factor, a value to correct the temperature sensitivity error inherent in the ADC 154, represented by the calculable variable V_ERR_TEMP, can be determined from the equation $$V\_ERR\_TEMP = (T1-T0) \times (K\_ERROR\_V/T), \quad (2)$$

wherein T1 is the estimated operating temperature of the BCM 48, and T0 was the temperature during which K_ERROR_V was determined at the end-of-line test on the production line of the BCM 48. The value for T0 is stored and available in memory within the BCM 48. T1, on the other hand, is determinable from operating temperature information delivered to the BCM 48 from the ECM 36 via the SDL 46. In particular, the intake air temperature sensed by the IAT sensor 42 electrically connected to the ECM 36 is communicated to the BCM 48 via the SDL 46 as measurable variable INTTEMP. Thus, with values for the variable INTTEMP provided to the BCM 48 in this way, the BCM 48 is able to determine a value for T1 and, thus, V_ERR_TEMP as well. As a result, each time that the voltage of the battery 54 is sensed, the value for V_ERR_TEMP is successfully used to negate any error in the value of the sensed voltage due to the temperature sensitivity of the ADC 154.

Regarding the fifth correction factor, a value to correct the voltage range sensitivity error inherent in the ADC 154, represented by the calculable variable V_ERR_VOLT, can be determined from the equation $$V\_ERR\_VOLT = (V3-12.60) \times (K\_ERROR\_V/V). \quad (3)$$

Thus, each time the voltage of the battery 54 is sensed, the value for V_ERR_VOLT is used to negate any error in the value of the sensed voltage due to the voltage range sensitivity of the ADC 154.

Regarding the sixth correction factor, a value to correct the voltage potential "line drop" between the battery 54 and the BCM 48 due to one or more electrical loads interposed between the battery 54 and the BCM 48, represented by the calculable variable VLD, can be determined, for example, from an equation such as $$VLD = LDNORM + (RDFGST \times LD\_RDFG) + (BLWRFSP \times LD\_BLWR) + (HIBMST \times LD\_HIBM) + \quad (4)$$

In this equation, the variable LDNORM represents a voltage line drop factor which is inherent in the particular structural configuration of the system 30, apart from any voltage line drop between the battery 54 and the BCM 48 due to specific electrical loads interposed therebetween, and is stored in memory within the BCM 48. RDFGST, BLWRFSP, and HIBMST, on the other hand, are variables having values communicated to the BCM 48 via the SDL 46 from the ECM 36 or respective body controllers (BC's) which are associated with various electrical loads within the system 30. In this example, the flag variable RDFGST, the duty cycle variable BLWRFSP, and the flag variable HIBMST indicate whether the rear window defogger 88 is on, the particular fan speeds of the front and rear HVAC blowers 80, and whether the hi-beam headlights of the automobile are on. Associated with each of these electrical loads is a corresponding predetermined voltage line drop factor (LD_RDFG, LD_BLWR, and LD_HIBM) which may be factored into the equation for ultimately determining the sum total line drop value VLD between the battery 54 and the BCM 48. Thus, if the flag variable RDFGST has a value of "1" (meaning the rear window defogger 88 is on), then the predetermined voltage line drop factor particularly associated with the rear window defogger 88, in this case LD_RDFG, will be included in determining the sum total line drop value VLD. If, instead, the flag variable RDFGST has a value of "0" (meaning the rear window defogger 88 is off), then the line drop factor LD_RDFG will not be included in determining the sum total line drop value VLD. These load-specific line drop factors LD_RDFG, LD_BLWR, and LD_HIBM, as well as any other drop factors for other electrical loads, are stored in memory within the BCM 48.

Once values are calculated for V_ERR_ADC, V_ERR_TEMP, V_ERR_VOLT, and VLD as described above, the sensed voltage for the battery 54 is adjusted with the correction factors to produce a corrected and more accurate voltage value represented by the calculable variable VBATCRT. That is, in particular, $$VBATCRT = VBATSEN + V\_ERR\_ADC + V\_ERR\_TEMP + V\_ERR\_VOLT + VLD. \quad (5)$$

This step of adjusting the sensed battery voltage with correction factors is depicted in FIG. 4 by flow diagram box 174.

F. Filtering the Sensed and Corrected Battery Voltage

Once the sensed battery voltage VBATSEN has been adjusted with correction factors to produce the corrected battery voltage VBATCRT, the corrected battery voltage VBATCRT must then be "filtered" with a first-order filter to obtain an average voltage value, represented by the calculable variable VBATFLT, to ultimately help determine the state of charge of the battery 54. Filtering the corrected battery voltage is accomplished by updating a running average with each new sensed value of the battery voltage. The time constant for the filter is calibratable and is defined by a filter constant FC_VOLT. As an example, the corrected voltage VBATCRT can be filtered using a first-order filter equation of the following form or an equivalent:

$$VBATFLT=VBATFLT+((VBATCRT-VBATFLT) \times (FC\_VOLT/256)). \quad (6)$$

The filter constant FC_VOLT relates to a filter time constant and is determined from the equation $$FC\_VOLT=256 \times (1-EXP(-T\_SAMPLE/TAU)) \quad (7)$$

wherein T_SAMPLE is the filter execution rate and TAU is the desired filter time constant (in seconds). In this way, the filter constant FC_VOLT is calibrated based on the desired degree of filtering needed to eliminate transients on the conductor 47 between the battery 54 and the BCM 48 and also based on the desired time delay for action to be taken in response to voltage changes. In light of such, a typical filter time constant is at least, for example, 1 to 5 seconds.

When, however, the ignition switch of the ignition system 34 is initially turned from the key-off position to the key-on position at engine start-up, the value for the filtered voltage VBATFLT is to be initialized to a predetermined value of, for example, 12.9 volts. If, however, the engine was turned off long enough before key-on that at least one value for the open-circuit voltage VBATOC of the battery 54 was sensed, then that most recent value for VBATOC is instead used as the initial value for VBATFLT when the ignition switch is initially turned into the key-on position at engine start-up.

Any value that is calculated or predetermined for VBATFLT is checked for reasonableness by the BCM 48. For example, if a value for VBATFLT ever falls outside of the voltage range 6.0 to 18.0 volts, the BCM 48 will then generate and send a trouble code warning to the DIC 50 via the SDL 46 to alert a driver or passenger that there is an operational problem.

This step of filtering the sensed and corrected battery voltage is depicted in FIG. 4 by flow diagram box 176.

G. Estimating the Electrolyte Temperature of the Battery

As briefly alluded to earlier herein, the calculable variable BATTEMP is periodically estimated by the BCM 48 during key-on and represents the estimated electrolyte temperature of the battery 54 (herein the "battery temperature"). Whenever the engine is being turned off, the last value estimated for BATTEMP is saved within a non-volatile memory within the BCM 48 as variable PRVTEMP (see flow diagram box 168) just before the ignition switch is turned from the key-on position to a key-off position. When the engine is later initially turned on when the ignition switch is again moved into a key-on position, the BCM 48 then quickly determines a value for the variable TIMEOFF which represents the length of time that the engine was off before being turned back on.

At this time when the ignition switch is initially turned on, if TIMEOFF is determined by the BCM 48 to be less than the predetermined rest time of the battery 54, and if PRVTEMP is less than the most current reading for INTTEMP (the intake air temperature sensed by the IAT sensor 42), then the initial value for BATTEMP is determined from the equation $$BATTEMP=PRVTEMP+(EBK1 \times TIME) \quad (8)$$

wherein EBK1 has a preferred calibratable value and TIME is expressed in hour time units. If, however, PRVTEMP is greater than the current reading for INTTEMP, then the initial value for BATTEMP is determined from the equation $$BATTEMP=PRVTEMP-(EBK2 \times TIME) \quad (9)$$

wherein EBK2 has a preferred calibratable value. In any other case, the initial value for BATTEMP is determined from the equation $$BATTEMP=INTTEMP+EBK3 \quad (10)$$

wherein EBK3 has a preferred calibratable value.

Any determinations by the BCM 48 as to whether the idle speed of the engine should be adjusted (that is, either boosted or unboosted) and as to whether certain electrical loads should forceably be reduced or deactivated (that is, "shed") will be inhibited until an initial value for BATTEMP is determined at engine start-up. If, however, an initial value for BATTEMP is not successfully determined within a predetermined period of time at engine start-up, the BCM 48 will assign a predetermined default temperature value, such as 25° C., to BATTEMP. In the particular case of a battery disconnect, BATTEMP will be initialized at a value, for example, that is equal to the most current reading of INTTEMP.

After BATTEMP has successfully received an initial value at engine start-up, subsequent updated values for BATTEMP are periodically determined during key-on from the equation $$BATTEMP=BATTEMP+(INTTEMP-BATTEMP) \times (1/THERMC(11))$$

wherein the calibratable thermal constant THERMC is determined from the equation $$THERMC=65536/KFTC, \quad (12)$$

and wherein the calibratable value KFTC is determined from the equation $$KFTC=(65536 \times TIME\_INT)/FTC. \quad (13)$$

FTC represents the filter time constant, and the time interval variable TIME_INT represents the sample execution rate.

If a value determined for BATTEMP is either extremely high or extremely low, then the value is made equal to predetermined maximum temperature value or a predetermined minimum temperature value as follows.

$$\text{If BATTEMP>MAXTEMP, then BATTEMP=MAXTEMP.} \quad (14)$$

$$\text{If BATTEMP<MINTEMP, then BATTEMP=MINTEMP.} \quad (15)$$

In equations (14) and (15), MAXTEMP has a preferred calibratable value that is greater than the preferred calibratable value assigned to MINTEMP.

At this point, it should be understood that for the above-described algorithm to work properly in periodically determining values for BATTEMP, each value for BATTEMP should preferably be saved in memory within the BCM 48 as a whole integer part with a separate fractional part. The fractional part is needed separately because the algorithm integrates the temperature difference over time. In fact, only the integer part is used as the value for BATTEMP. The fractional part is merely retained for future integration.

This step of estimating the electrolyte temperature of the battery is depicted in FIG. 4 by flow diagram box 166. Also in FIG. 4, the step of saving values of BATTEMP in memory is depicted by flow diagram box 168.

H. Estimating the Battery Current

Once values for the filtered battery voltage VBATFLT and the estimated battery temperature BATTEMP are determined, the values are then used along with the most recently calculated value for the state of charge of the battery 54 while the engine is running, represented by variable RUNSOC, to successfully estimate the level of electric current produced by the battery 54. This estimated level of electric current produced by the battery 54 is represented by the calculable variable BATCRNT.

To estimate a value for BATCRNT, preferably three look-up tables stored in memory within the BCM 48 are utilized. For example, if RUNSOC=95%, then the first table should be used to estimate a value for BATCRNT. Alternatively, if RUNSOC=85%, then the second table should be used. Lastly, if RUNSOC=75%, then the third table should be used. If, however, 85%<RUNSOC<95%, then a value for BATCRNT should be linearly interpolated from the data in both the first table and the second table. Similarly, if 75%<RUNSOC<85%, then a value for BATCRNT should be linearly interpolated from the data in both the second and third table. As an example, FIG. 11 alternatively shows a graph wherein all data from a table for a given state of charge (SOC) is plotted in graphical form. Note that the graph provides values for BATCRNT which are based on values of BATTEMP and VBATFLT for a given state of charge. However, for a particular pair of determined values for BATTEMP and VBATFLT, linear interpolation is generally required between the plotted lines of predetermined data included within FIG. 11 to successfully estimate a value for BATCRNT for a given state of charge. In addition, if a particular pair of determined values for BATTEMP and VBATFLT fall outside the outer bounds of the plotted lines of predetermined data included in FIG. 11, then the determined values should be capped to the closest relevant plotted line included on the graph.

This step of estimating the battery current is depicted in FIG. 4 by flow diagram box 178.

I. Estimating the Battery Ampere-Hours

Every time an estimated value for BATCRNT is periodically determined during key-on, the value for BATCRNT is integrated to estimate the net ampere-hours (or amp-hours), represented by the variable AMPHRS, into the battery 54. In general, as the state of charge of the battery 54 decreases during an operation condition (such as idling) which discharges (electrically weakens) the battery 54, the estimated value of AMPHRS then decreases and becomes more negative in value.

Once a value for AMPHRS and a value for related variable AMPHRSD are determined, then the value for AMPHRS is used to estimate the state of charge of the battery 54 while the engine is running. The value for AMPHRSD, on the other hand, is used by the BCM 48 in determining whether to adjust (boost or unboost) the idle speed of the engine and whether to selectively and forceably reduce or deactivate (that is, shed) certain electrical loads to reduce the electric current draw on the battery 54.

When the ignition switch of the ignition system 34 is initially turned from the key-off position to the key-on position to start-up the engine, the values for both AMPHRS and AMPHRSD are initialized to 0 amp-hours. After this brief key-on initialization period, estimated values for AMPHRS and AMPHRSD are determined from the following equations.

$$\text{AMPHRS} = \text{AMPHRS}_{OLD} + (\text{BATCRNT} \times \text{TIME\_INT})/3600 \quad (16)$$

$$\text{AMPHRSD} = \text{AMPHRS} + (\text{BATCRNT} \times \text{TIME\_INT})/3600 \quad (17)$$

If AMPHRSD>0 or RUNSOC>80%, then AMPHRSD=0. (18)

If AMPHRS>AMPHRSMAX, then AMPHRS=AMPHRSMAX (19)

If AMPHRS<AMPHRSMIN, then AMPHRS=AMPHRSMIN. (20)

If AMPHRSD<AMPHRSMIN, then AMPHRSD=AMPHRSMIN (21)

The time interval variable TIME_INT represents the sample execution rate. The calibratable limiting variables AMPHRSMAX and AMPHRSMIN preferably have differing values dependent upon the size of the battery 54, wherein the value for AMPHRSMAX is greater than the value for AMPHRSMIN.

At this point, it is worth noting that the variable AMPHRS tracks both the charging and discharging states of the battery 54 and is thereby used to estimate the state of charge of the battery 54 while the engine is running. The variable AMPHRSD, in contrast, only tracks the discharging states of the battery 54 under limited conditions. As a result, the variable AMPHRSD is used, as briefly mentioned earlier, by the BCM 48 in determining whether to adjust the idle speed of the engine and whether to selectively shed certain electrical loads to reduce the electric current draw on the battery 54.

This step of estimating the battery amp-hours is depicted in FIG. 4 by flow diagram box 180.

J. Estimating the State of Charge of the Battery While the Engine Is Running

The state of charge of the battery 54 while the engine is running is represented by the calculable variable RUNSOC. To determine an estimated value for RUNSOC, the following equations are used.

$$\text{RUNSOC} = \text{STRTSOC} + (100\% \times \text{AMPHRS})/\text{BATCAP} \quad (22)$$

If RUNSOC>100%, then RUNSOC=100%. (23)

If RUNSOC<0%, then RUNSOC=0%. (24)

The calibratable variable BATCAP, which represents the inherent power capacity of the battery 54, is a predetermined constant based, for example, on a 20-hour battery discharge test conducted at 25° C. This step of estimating the state of charge of the battery 54 while the engine is running is depicted in FIG. 4 by flow diagram box 182.

When new values for RUNSOC are periodically determined during key-on, older values are generally overwritten in memory within the BCM 48 by new values. This step of saving new values of RUNSOC in memory within the BCM 48 is depicted in FIG. 4 by flow diagram box 184.

K. Adjusting AMPHRSD for Change in Battery Capacity with Temperature

Before the BCM 48 can make decisions based on the value of AMPHRSD of whether to adjust the engine idle speed or shed electrical loads, the value for AMPHRSD must first be scaled and adjusted to take into account changes in the power capacity of the battery 54 due to changes in temperature. The properly scaled and adjusted value for AMPHRSD is represented by the variable AHRSADJ.

At this point, however, it is worth noting that the BCM 48 has the ability to command and dictate the boosting or unboosting of the idle speed of the engine based largely upon the value of AHRSADJ. In general, the BCM 48 can dictate that the idle speed of the engine be set at one of four boost levels which are designated idle boost level 0, idle boost level 1, idle boost level 2, and idle boost level 3. Idle boost level 0 is the normal idle speed operating level for the engine, idle boost level 1 is a faster and more critical operating level, idle boost level 2 is an even faster and even more critical operating level, and idle boost level 3 is the most critical operating level wherein the BCM 48 commands the highest possible idle speed for the engine. Depending on the operating circumstances at a given time, the BCM 48 may command entry into one of the upper idle boost levels (i.e., level 1, 2, or 3) in light of the circumstances to help avoid sudden increases in creep torque and also maintain good idle quality, stability, and driveability. Depending on the particular idle boost level that the engine has been commanded to operate in, one of four software flag variables IB0FLAG, IB1FLAG, IB2FLAG, and IB3FLAG is correspondingly set electrically high while the other three are set electrically low. For example, if idle boost level 1 is commanded by the BCM 48, then flag variable IB1FLAG will be set electrically high and the three other flag variables will be set electrically low.

Also, at this point, it worth noting that the BCM 48 also has the ability to command and dictate the selective deactivation or shedding of certain electrical loads to reduce the current draw (discharging) of the battery 54. The BCM 48 bases its decisions to shed certain loads largely upon the value of AHRSADJ. In general, the BCM 48 can dictate that load shedding activities be conducted on one of four load shed levels which are designated load shed level 0, load shed level 1, load shed level 2, and load shed level 3. Load shed level 0 is the normal load shed level where the state of charge of the battery 54 is determined to be at a healthy operating level. Thus, in load shed level 0, no electrical loads are forceably reduced or deactivated. If, on the other hand, the BCM 48 senses that the state of charge of the battery 54 is beginning to wane or has dropped below a healthy operating range, then the BCM 48 will command one of the upper load shed levels (i.e., level 1, 2, or 3) wherein electrical loads are forceably reduced or altogether deactivated. In this way, excessive discharging of the battery 54 caused by activated electrical loads is thereby effectively reduced. Depending on the particular load shed level commanded by the BCM 48, one of four software flag variables LS0FLAG, LS1FLAG, LS2FLAG, and LS3FLAG is correspondingly set electrically high while the other three are set electrically low. For example, if load shed level 2 is commanded by the BCM 48, then flag variable LS2FLAG will be set electrically high and the three other flag variables will be set electrically low.

In light of such, if the BCM 48 determines that the value for RUNSOC is greater than, for example, 80%, then any attempt by the BCM 48 to command new entry into an upper idle boost level or an upper load shed level will be prevented unless and until the sensed battery voltage drops below a predetermined critical value. In addition, any rise in the value of RUNSOC above, for example, 80% will not suddenly allow the BCM 48 to permit premature exit from an upper idle boost level or an upper load shed level.

In general, the value for AMPHRSD is scaled and adjusted based on the value of RUNSOC so that a value for AHRSADJ can ultimately be determined according to the following equations.

If RUNSOC>30% or RUNSOC=30%, then SOCADJ_FACTOR= 1.0. (25)

If RUNSOC<30% and RUNSOC>10%, then SOCADJ_FACTOR=2.0. (26)

If RUNSOC=10% or RUNSOC<10%, then SOCADJ_FACTOR= 3.0. (27)

AHRSADJ=AMPHRSD×SOCADJ_FACTOR (28)

Once a value for AHRSADJ is determined in this manner, the value for AHRSADJ is then utilized for determining idle boost levels and load shed levels. This step of scaling and adjusting AMPHRSD to compensate for change in battery capacity with temperature is depicted in FIG. 6 by flow diagram box 192.

L. Making Boost Decisions with Regard to the Idle Speed of the Engine

Whenever the BCM 48 determines that the idle speed of the engine should be changed by either being boosted or unboosted, any request by the BCM 48 for entry into a particular new idle boost level is communicated via the SDL 46 to the ECM 36 as a software command variable IDLBSTL. The variable IDLBSTL contains a byte that indicates to the ECM 36 which idle boost level is specifically being requested. Once the idle boost level specifically requested by the BCM 48 is determined by the ECM 36, the ECM 36 then commands the idle speed actuator 60 to either boost or unboost the idle speed of the engine accordingly. However, any request by the BCM 48 to increase the engine idle speed will be delayed by the ECM 36 until the next throttle event. Also, if the SDL 46 ever begins to malfunction, the ECM 36 is to detect such and continue to command the idle speed actuator 60 to maintain the idle boost level last requested by the BCM 48. If, however, the fault detection circuit 144 of the ECM 36 determines that the generator 32 is not functioning, the ECM 36 will then ignore all idle boost requests from the BCM 48.

Figure 6:
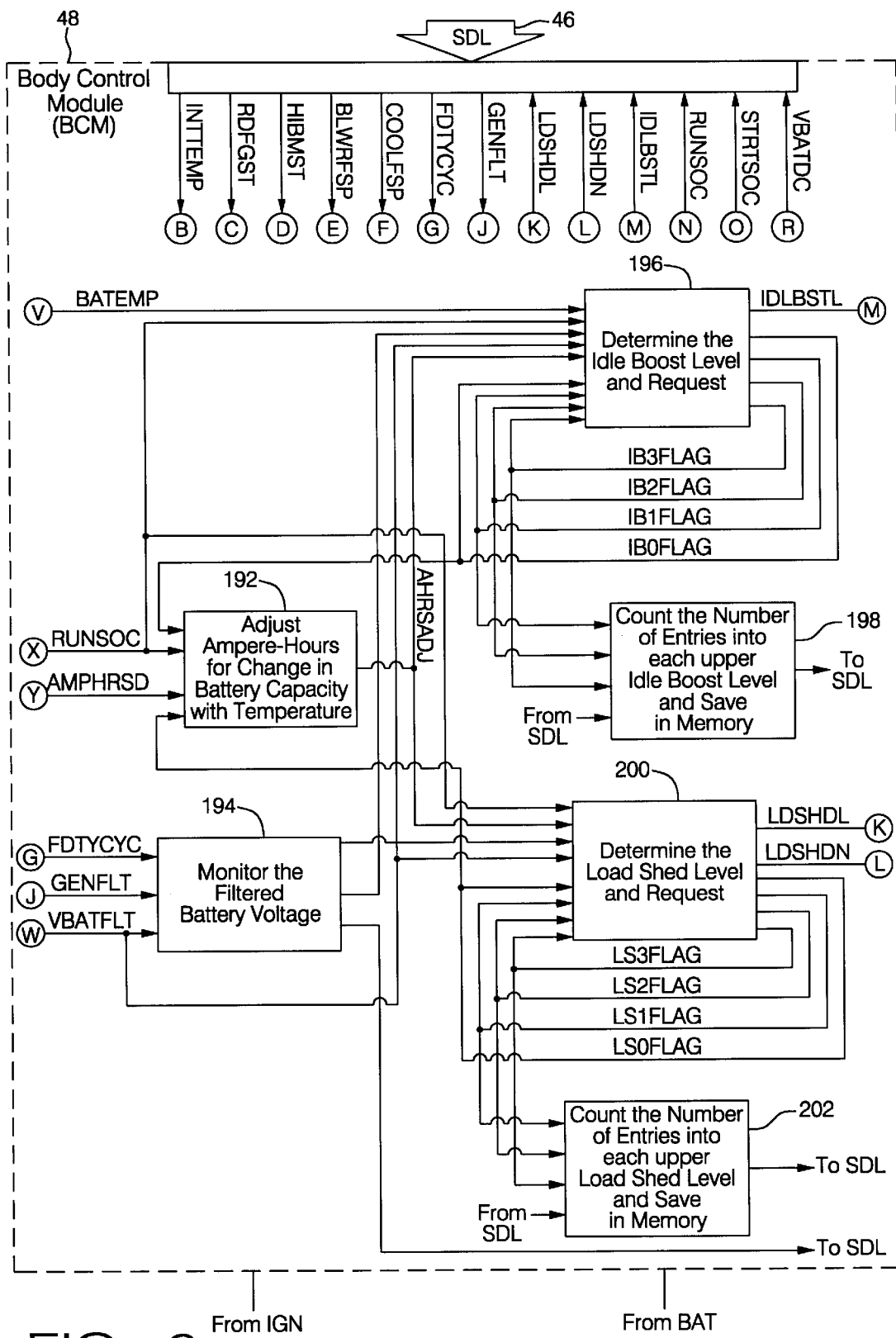
FIG. 6 is an electrical block diagram of the body control module in FIG. 1, wherein a continuation of the software variables flow diagram of FIG. 4 is illustrated and highlights how determinations regarding the boosting of the idle speed of the engine and the shedding of electrical loads on the battery are resolved.
Figure 8:
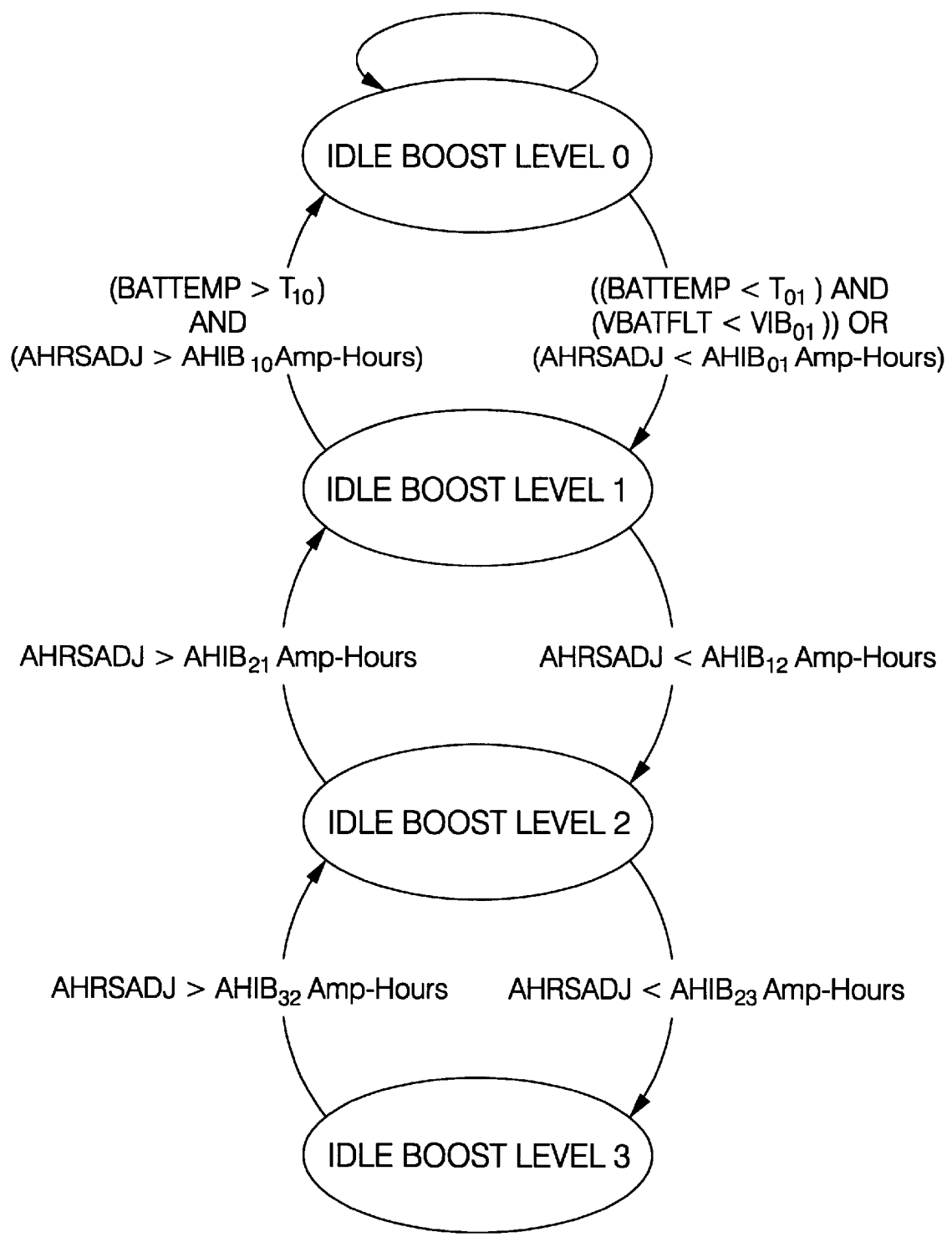
FIG. 8 is a software state diagram for boosting the idle speed of the engine as dictated by the software variables in FIG. 6, wherein four states (or idle boost levels) are particularly illustrated.

For the following discussion, see FIG. 8 and see also flow diagram box 196 in FIG. 6.

1. Entering Idle Boost Level 1

If BATTEMP is less than calibratable variable $T_{01}$ (in degrees Celsius) and VBATFLT is less than calibratable variable $VIB_{01}$ (in volts), or if AHRSADJ is less than calibratable variable $AHIB_{01}$ (in amp-hours), while idle boost level 1, idle boost level 2, and idle boost level 3 are not currently active, then entry into idle boost level 1 will be initiated by the BCM 48. See FIG. 8.

In initiating entry into idle boost level 1, the following events will occur. First, the flag variable IB1FLAG will be set electrically high (to "1" or "true"), and flag variable IB0FLAG will be set electrically low (to "0" or "false"), thereby indicating that only idle boost level 1 is active. Second, the BCM 48 will communicate variable IDLBSTL via the SDL 46 to the ECM 36, thereby requesting that the idle speed of the engine be boosted by the idle speed actuator 60 accordingly.

2. Exiting Idle Boost Level 1

If BATTEMP is greater than calibratable variable $T_{10}$ and AHRSADJ is greater than calibratable variable $AHIB_{10}$ (where $AHIB_{10}>AHIB_{01}$) while idle boost level 1 is currently active, then exit from idle boost level 1 will be initiated by the BCM 48.

In initiating exit from idle boost level 1, the following events will occur. First, the flag variable IB1FLAG will be set electrically low, and the flag variable IB0FLAG will be set electrically high, thereby indicating that only idle boost level 0 is active. Second, the BCM 48 will communicate variable IDLBSTL via the SDL 46 to the ECM 36, thereby requesting that the idle speed of the engine be unboosted by the idle speed actuator 60 accordingly.

3. Entering Idle Boost Level 2

If AHRSADJ is less than calibratable variable $AHIB_{12}$ (where $AHIB_{01}>AHIB_{12}$) while idle boost level 1 is currently active, then entry into idle boost level 2 will be initiated by the BCM 48. See FIG. 8.

In initiating entry into idle boost level 2, the following events will occur. First, the flag variable IB2FLAG will be set electrically high, and flag variable IB1FLAG will be set electrically low, thereby indicating that only idle boost level 2 is active. Second, the BCM 48 will communicate variable IDLBSTL via the SDL 46 to the ECM 36, thereby requesting that the idle speed of the engine be boosted by the idle speed actuator 60 accordingly.

4. Exiting Idle Boost Level 2

If AHRSADJ is greater than calibratable variable $AHIB_{21}$ (where $AHIB_{10} > AHIB_{21} > AHIB_{12}$) while idle boost level 2 is currently active, then exit from idle boost level 2 will be initiated by the BCM 48.

In initiating exit from idle boost level 2, the following events will occur. First, the flag variable IB2FLAG will be set electrically low, and the flag variable IB1FLAG will be set electrically high, thereby indicating that only idle boost level 1 is active. Second, the BCM 48 will communicate variable IDLBSTL via the SDL 46 to the ECM 36, thereby requesting that the idle speed of the engine be unboosted by the idle speed actuator 60 accordingly.

5. Entering Idle Boost Level 3

If AHRSADJ is less than calibratable variable $AHIB_{23}$ (where $AHIB_{12} > AHIB_{23}$) while idle boost level 2 is currently active, then entry into idle boost level 3 will be initiated by the BCM 48. See FIG. 8.

In initiating entry into idle boost level 3, the following events will occur. First, the flag variable IB3FLAG will be set electrically high, and flag variable IB2FLAG will be set electrically low, thereby indicating that only idle boost level 3 is active. Second, the BCM 48 will communicate variable IDLBSTL via the SDL 46 to the ECM 36, thereby requesting that the idle speed of the engine be boosted by the idle speed actuator 60 accordingly.

6. Exiting Idle Boost Level 3

If AHRSADJ is greater than calibratable variable $AHIB_{32}$ (where $AHIB_{21} > ABIB_{32} > AHIB_{23}$) while idle boost level 3 is currently active, then exit from idle boost level 3 will be initiated by the BCM 48.

In initiating exit from idle boost level 3, the following events will occur. First, the flag variable IB3FLAG will be set electrically low, and the flag variable IB2FLAG will be set electrically high, thereby indicating that only idle boost level 2 is active. Second, the BCM 48 will communicate variable IDLBSTL via the SDL 46 to the ECM 36, thereby requesting that the idle speed of the engine be unboosted by the idle speed actuator 60 accordingly.

A visual summary of the four idle boost level states and how each idle boost level is entered and exited is set forth in the state diagram illustrated in FIG. 8. Also, FIG. 6 illustrates a software variables flow diagram highlighting how various variables are used in determining idle boost levels.

M. Making Shed Decisions with Regard to the Electrical Loads

Whenever the BCM 48 senses that the state of charge of the battery 54 is beginning to wane or has dropped below a healthy operating range, any request then made by the BCM 48 for entry into an upper load shed level to thereby reduce the electrical load on the battery 54 is communicated via the SDL 46 to the body controllers (BC's) as a software command variable LDSHDL. The variable LDSHDL contains a byte that indicates to the body controllers which load shed level is being requested and which particular electrical loads should be forceably reduced or deactivated altogether. Once the load shed level specifically requested by the BCM 48 is determined by the body controllers, the appropriate body controllers will then correspondingly reduce or deactivate their associated electrical loads as selectively dictated by the particular load shed level being requested by the BCM 48. In this way, by requesting entry into an upper load shed level (i.e., level 1, 2, or 3), the BCM 48 thereby prevents excessive discharging of the battery 54 caused by the operations of the electrical loads. In contrast, when operating at load shed level 0 (normal mode), no electrical loads are forcibly reduced or deactivated.

Figure 9:
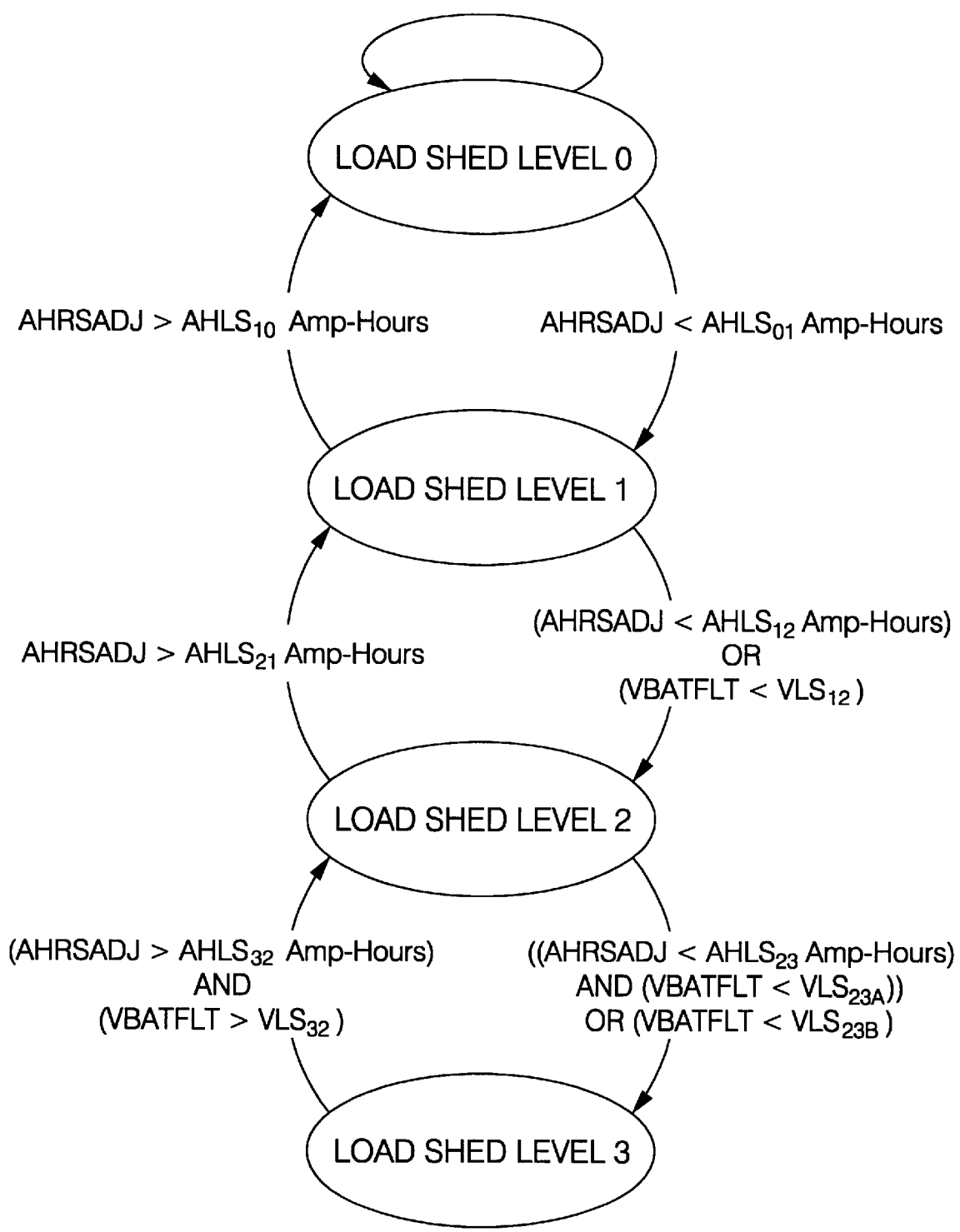
FIG. 9 is a software state diagram for shedding electrical loads on the battery as dictated by the software variables in FIG. 6, wherein four states (or load shed levels) are particularly illustrated.

For the following discussion, see FIG. 9 and see also flow diagram box 200 in FIG. 6.

1. Entering Load Shed Level 1

If AHRSADJ is less than calibratable variable $AHLSO_{01}$ (in amp-hours) while load shed level 1, load shed level 2, and load shed level 3 are not currently active, then entry into load shed level 1 will be initiated by the BCM 48. See FIG. 9.

In initiating entry into load shed level 1, the following events will occur. First, flag variable LS1FLAG will be set electrically high (to "1" or "true"), and flag variable LS0FLAG will be set electrically low (to "0" or "false"), thereby indicating that only load shed level 1 is active. Second, the BCM 48 will communicate the variable LDSHDL via the SDL 46 to all of the body controllers, thereby requesting that the body controllers forceably reduce or deactivate their associated electrical loads as selectively dictated by the load shed level 1 request.

In particular, at load shed level 1, the body controllers shall reduce the level of electric current supplied to their respective electrical loads by a predetermined percentage amount. The body controllers 106 and 108 which are particularly associated with the heated mirrors 86 and the rear window defogger 88 shall initiate cycling of both of these electrical loads at a reduced duty cycle. In doing so, however, the body controller 108 shall make sure that the light indicator 134 associated with the rear window defogger 88 is properly illuminated and that the associated timer shall continue counting normally and time out properly even when the load shed level 1 request is received by the body controller 108. If, however, the heated mirrors 86 and the rear window defogger 88 have not been activated by the driver or passenger, then no cycling shall occur.

In addition, the body controller 104 associated with the front and rear heated seats 84 shall initiate cycling of the enable lines leading to the front and rear heated seats 84 at an alternative predetermined reduced frequency rate and at an alternative predetermined reduced duty cycle. If, however, the front and rear heated seats 84 have not been activated by the driver or passenger, then no cycling shall occur.

Further, the body controller 100 associated with the front and rear HVAC blowers 80 shall dictate that the normal blower fan speed be reduced and that the setting for the manual control 120 for only the rear blower be reduced by one setting level (for example, from "medium" to "low"). If, however, the manual control 120 for the blowers 80 is in an "off" position and the blowers 80 are not operating, then the body controller 100 shall take no action in response to the load shed level 1 request made by the BCM 48. When the blowers 80, however, are operating when the BCM 48 requests load shed level 1, the body controller 100 can successfully reduce the fan speed of the blowers 80 with appropriate delays and gently ramped speed changes to help minimize noticeability by the driver or passenger that load shed level 1 remedial activities are being carried out.

In general, the remedial activities associated with load shed level 1 are generally not noticeable by the driver or passenger.

2. Exiting Load Shed Level 1

If AHRSADJ is greater than calibratable variable $AHLS_{10}$ (where $AHLS_{10} > AHLS_{01}$) while load shed level 1 is currently active, then exit from load shed level 1 will be initiated by the BCM 48.

In initiating exit from load shed level 1, the following events will occur. First, the flag variable LS1FLAG will be set electrically low, and the flag variable LS0FLAG will be set electrically high, thereby indicating that only load shed level 0 is active. Second, the BCM 48 will communicate the variable LDSHDL via the SDL 46 to all of the body controllers, thereby requesting that the body controllers conform their reduction and deactivation activities in accordance with the load shed level 0 request.

In response to this new load shed level 0 request, the body controllers 100, 104, 106, and 108 will reinstate the blowers 80, the heated seats 84, the heated mirrors 86, and the rear window defogger 88 to their normal levels of operation. In doing so, the body controller 100 may briefly limit the maximum fan speed for the blowers 80 to the fan speed associated with load shed level 1 during the current ignition cycle to thereby help prevent a noticeable fluctuation in the fan speed of the blowers 80 from occurring.

3. Entering Load Shed Level 2

If AHRSADJ is less than calibratable variable $AHLS_{12}$ (where $AHLS_{01} > AHLS_{12}$) or VBATFLT is less than calibratable variable $VLS_{12}$ (in volts) while load shed level 1 is currently active, then entry into load shed level 2 will be initiated by the BCM 48. See FIG. 9.

In initiating entry into load shed level 2, the following events will occur. First, flag variable LS2FLAG will be set electrically high, and the flag variable LS1FLAG will be set electrically low, thereby indicating that only load shed level 2 is active. Second, the BCM 48 will communicate the variable LDSHDL via the SDL 46 to all of the body controllers, thereby requesting that the body controllers forcibly reduce or deactivate their associated electrical loads as selectively dictated by the load shed level 2 request.

In particular, at load shed level 2, the body controllers shall reduce the level of electric current supplied to their respective electrical loads by a predetermined percentage amount greater than the predetermined percentage amount associated with load shed level 1. The body controllers 106 and 108 which are particularly associated with the heated mirrors 86 and the rear window defogger 88 shall initiate cycling of both of these electrical loads at an even further reduced duty cycle than that associated with load shed level 1. In doing so, however, the body controller 108 shall make sure that the timer associated with the light indicator 134 for the rear window defogger 88 shall continue counting normally and time out properly even when the load shed level 2 request is received by the body controller 108. If, however, the heated mirrors 86 and the rear window defogger 88 have not been activated by the driver or passenger, then no cycling shall occur.

In addition, the body controller 104 associated with the front and rear heated seats 84 shall initiate cycling of the enable lines leading to the front and rear heated seats 84 at an alternative predetermined reduced frequency rate and at an alternative predetermined reduced duty cycle. If, however, the front and rear heated seats 84 have not been activated by the driver or passenger, then no cycling shall occur.

Further, the body controller 100 associated with the front and rear HVAC blowers 80 shall dictate that the normal blower fan speed be even further reduced (as compared to load shed level 1) and that only the rear blower be forcibly and completely deactivated. If, however, the blowers 80 are being operated in a "defrost mode" (as opposed to an "air-conditioning mode"), then the body controller 100 shall take no action in response to the load shed level 2 request made by the BCM 48. Also, if the manual control 120 for the blowers 80 is in an "off" position such that the blowers 80 are not operating, then the body controller 100 shall take no action in response to the load shed level 2.

Still further, the body controller 112 shall cut back the courtesy door lights 92, and the body controller 110 shall reduce operation of the rear window wiper 90 to pulse mode if the rear window wiper 90 was operating in continuous mode.

At this same time, the BCM 48 shall send a notice message by way of variable LDSHDN to the DIC 50 via SDL 46. In doing so, the DIC 50 thereafter displays the message "Battery Saver Active" to visually alert the driver or passenger that remedial activities associated with load shed level 2 are being carried out.

4. Exiting Load Shed Level 2

If AHRSADJ is greater than calibratable variable $AHLS_{21}$ (where $AHLS_{10} > AHLS_{21} > AHLS_{12}$) while load shed level 2 is currently active, then exit from load shed level 2 will be initiated by the BCM 48.

In initiating exit from load shed level 2, the following events will occur. First, the flag variable LS2FLAG will be set electrically low, and the flag variable LS1FLAG will be set electrically high, thereby indicating that only load shed level 1 is active. Second, the BCM 48 will communicate the variable LDSHDL via the SDL 46 to all of the body controllers, thereby requesting that the body controllers conform their reduction and deactivation activities in accordance with the load shed level 1 request.

In response to this new load shed level 1 request, the body controllers 100, 104, 106, and 108 then reinstate the blowers 80, the heated seats 84, the heated mirrors 86, and the rear window defogger 88 to their levels of operation under load shed level 1. Thus, with specific regard to the blowers 80, the blower fan speed is changed and increased back to its slightly reduced level of speed associated with load shed level 1, and the rear blower is particularly reactivated to operate at the level of performance dictated by load shed level 1. In addition, the body controller 110 then reinstates the rear window wiper 90 to its level of operation under load shed level 1 (which is the same as load shed level 0), and the body controller 112 then reinstates the courtesy door lights 92 to their level of operation under load shed level 1 (which is the same as load shed level 0) as well.

5. Entering Load Shed Level 3

If AHRSADJ is less than calibratable variable $AHLS_{23}$ (where $AHLS_{12} > AHLS_{23}$) and VBATFLT is less than calibratable variable $VLS_{23A}$ (where $VLS_{23A}>VLS_{12}$), or if VBATFLT is less than calibratable variable $VLS_{23B}$ (where $VLS_{23A}>VLS_{23B}$), while load shed level 2 is currently active, then entry into load shed level 3 will be initiated by the BCM 48. See FIG. 9.

In initiating entry into load shed level 3, the following events will occur. First, flag variable LS3FLAG will be set electrically high, and the flag variable LS2FLAG will be set electrically low, thereby indicating that only load shed level 3 is active. Second, the BCM 48 will communicate the variable LDSHDL via the SDL 46 to all of the body controllers, thereby requesting that the body controllers forcibly reduce or deactivate their associated electrical loads as selectively dictated by the load shed level 3 request.

In particular, at load shed level 3, all body controllers then reduce the level of electric current supplied to their associated electrical loads as much as possible without impacting the overall safe operation of the automobile by the driver. More particularly, the body controllers 106 and 108 forcibly deactivate the heated mirrors 86 and the rear window defogger 88 as well as their respective indicator lights 130 and 134. If the driver wants to override the deactivations of the heated mirrors 86 and the rear window defogger 88, then the driver must manually reactivate their associated manual controls 132 and 136.

In addition, the body controller 104 forcibly deactivates the front and rear heated seats 84 as well as the indicator light 126. If the driver wants to override the deactivations of the heated seats 84, then the driver must manually reactivate its associated manual control 128.

Further, body controller 100 and body controller 102 forcibly deactivate both the HVAC blowers 80 and the AC compressor clutch 82. If, however, these electrical loads are being operated in a "defrost mode," then both the body controller 100 and the body controller 102 shall take no action in response to the load shed level 3 request made by the BCM 48. If the driver chooses to manually override the deactivations of one or both of the HVAC blowers 80 and the AC compressor clutch 82 by manually activating one or more of the manual controls 120 and 124, then any subsequent load shed level 3 request made by the BCM 48 will be ignored by the body controllers 100 and 102 for the duration of the ignition cycle. In this way, for example, fluctuations in the fan speed of the blowers 80 are effectively minimized.

Still further, the body controller 114 forcibly reduces the interior lights 94 to a maximum dimming level. Since the remedial activities associated with load shed level 3 are quite noticeable by the driver or passenger, the BCM 48 shall send a notice message by way of variable LDSHDN to the DIC 50 via SDL 46. In doing so, the DIC 50 thereafter displays the message "Battery Saver Active" to visually alert the driver that remedial activities associated with load shed level 3 are being carried out.

6. Exiting Load Shed Level 3

If AHRSADJ is greater than calibratable variable $AHLS_{32}$ (where $AHLS_{21}>AHLS_{32}>AHLS_{23}$) and VBATFLT is greater than calibratable variable $VLS_{32}$ (where $VLS_{32}>VLS_{23A}$) while load shed level 3 is currently active, then exit from load shed level 3 will be initiated by the BCM 48.

In initiating exit from load shed level 3, the following events will occur. First, the flag variable LS3FLAG will be set electrically low, and the flag variable LS2FLAG will be set electrically high, thereby indicating that only load shed level 2 is active. Second, the BCM 48 will communicate the variable LDSHDL via the SDL 46 to all of the body controllers, thereby requesting that the body controllers conform their reduction and deactivation activities in accordance with the load shed level 2 request.

In response to this new load shed level 2 request, the body controllers 106 and 108 then reinstate the heated mirrors 86 and the rear window defogger 88 to their levels of operation under load shed level 2. However, after having been completely deactivated under load shed level 3, both the heated mirrors 86 and the rear window defogger 88 are only reactivated if the driver or passenger activates manual controls 132 and 136. If the driver chooses to manually reactivate the heated mirrors 86 and the rear window defogger 88 in this way, then the heated mirrors 86 and the rear window defogger 88 will not be deactivated for the duration of the ignition cycle, even if the BCM 48 requests load shed level 3 again before the end of the ignition cycle.

Further, the body controllers 100 and 104 then reinstate the HVAC blowers 80 and the heated seats 84 to their levels of operation under load shed level 2. However, after having been completely deactivated under load shed level 3, both the blowers 80 and the heated seats 84 are only reactivated if the driver or passenger activates manual controls 120 and 128. If the driver or passenger chooses to manually reactivate the blowers 80 and the heated seats 84 in this way, then the blowers 80 and the heated seats 84 will not be deactivated for the duration of the ignition cycle, even if the BCM 48 requests load shed level 3 again before the end of the ignition cycle.

Still further, the body controller 114 then reinstates the interior lights 94 to their level of operation under load shed level 2, and the "Battery Saver Active" message is removed from the visual display of the DIC 50.

In summary, when the BCM 48 requests entry into load shed level 3, a message is sent via the SDL 46 to all body controllers dictating that all non-safety related electrical loads be forcibly deactivated and turned off. Thereafter, the weakening discharge suffered by the battery 54 is generally expected to be ameliorated and reduced, even reduced to the point that the BCM 48 will be able to thereafter successively exit load shed level 3, exit load shed level 2, and exit load shed level 1 back down to load shed level 0 (normal mode). In doing so, however, the forcibly deactivated electrical loads will not be automatically reactivated. Instead, the driver must manually reactivate each electrical load that was forcibly deactivated if he so chooses.

A visual summary of the four load shed level states and how each load shed level is entered and exited is set forth in the state diagram illustrated in FIG. 9. Also, FIG. 6 illustrates a software variables flow diagram highlighting how various variables are used in determining load shed levels.

N. Determining the Optimum Charge Voltage for the Battery

To ensure that the method 160, according to the present invention, when implemented, successfully prevents undercharging and overcharging as well as gassing in the battery 54, improves battery life and the life of various lights within the automobile, and improves overall automobile fuel economy, both the estimated value BATTEMP for the battery temperature and the estimated value RUNSOC for the running state of charge of the battery 54 are utilized to determine a value for variable VBATOPT which represents the optimum charge voltage for the battery 54. In particular, the phrase "optimum charge voltage" as used herein is generally defined as the battery charge voltage that results in maximum battery life while maintaining reliable engine start-up capability and a sufficient amount of stored voltage power for operating various electrical loads and for handling discharge when the engine idles. Once a value is obtained for VBATOPT, the value is first adjusted and thereafter converted into an electric pulse-width modulated (PWM) duty cycle signal (i.e., a command signal) that is communicated via the SDL 46 from the BCM 48 to the ECM 36. After being received by the ECM 36, the electric PWM duty cycle signal is then communicated to the L-terminal 68 of the generator 32 via the conductor 64. Once the generator 32 receives the electric PWM duty cycle signal from the ECM 36, the generator 32 then adjusts its internal voltage setpoint in accordance with the duty cycle signal. Thereafter, the generator 32 then delivers a charge voltage, via the output terminal 76, to the battery 54, wherein the voltage level of the charge voltage is dictated and regulated by the duty cycle signal that is based on the value for VBATOPT.

A value for VBATOPT can be successfully obtained from the graphical chart illustrated in FIG. 12. In particular, values determined for both BATTEMP and RUNSOC according to the sections hereinabove are used with the chart to cross-reference and obtain, via interpolation, a value for VBATOPT from the chart. The chart in FIG. 12 includes three primary plotted lines which correspond to state of charge numerical boundary limits. Values for BATTEMP and RUNSOC which are beyond the plotted lines of the chart should be capped to the closest value within the bounds of the plotted lines. The three plotted lines are based, for example, on three sets of predetermined and calibrated data. These three sets of data are utilized to derive the following three calibratable equations from which values for VBATOPT can be determined.

If RUNSOC>SOCTH7, then VBATOPT=BATTEMP×CK1+CK2 (29)

Equation (29) is the "nominal" equation for a battery charge voltage with a state of charge of SOCTH7, wherein SOCTH7, CK1, and CK2 are calibratable variables.

If RUNSOC>SOCTH8, then VBATOPT=BATTEMP×CK3+CK4 (30)

Equation (30) is the "float limitation" equation for a battery charge voltage with a state of charge greater than SOCTH8, wherein SOCTH8, CK3, and CK4 are calibratable variables.

If RUNSOC>SOCTH9, then VBATOPT=BATTEMP×CK5+CK6 (31)

Equation (31) is the "upper limit" equation for a battery charge voltage with a state of charge less than SOCTH9, wherein SOCTH9, CK5, and CK6 are calibratable variables.

This step of determining the optimum charge voltage for the battery 54 is depicted in FIG. 4 by flow diagram box 186.

O. Adjusting the Optimum Charge Voltage of the Battery

Figure 5:
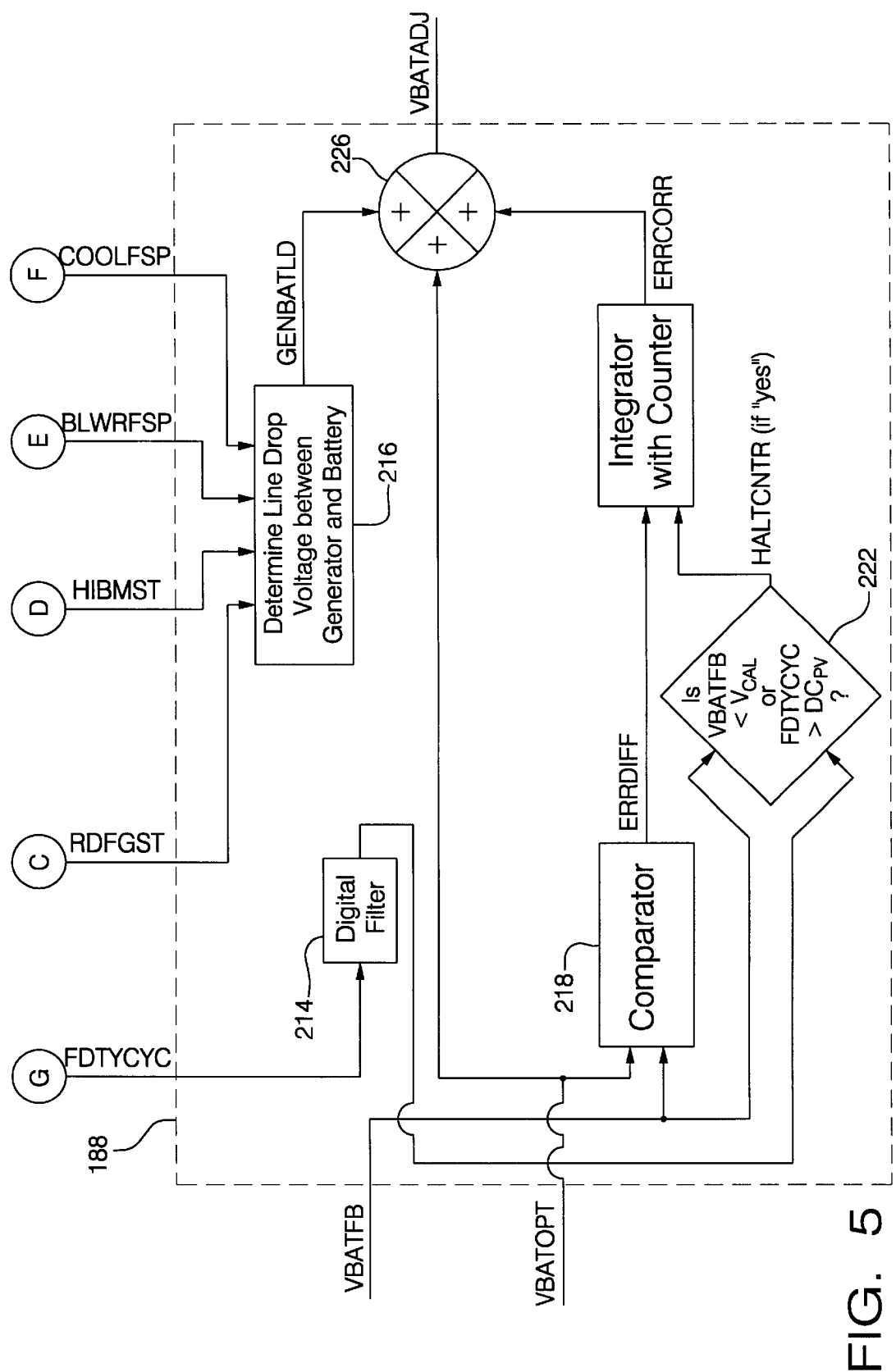
FIG. 5 is a software variables flow diagram highlighting a particular aspect of the software variables flow diagram of FIG. 4 and illustrating how an optimum charge voltage for the battery of FIG. 1 is adjusted and ultimately determined.

As illustrated in FIG. 5, before an optimum charge voltage for the battery 54 is converted into an electric PWM duty cycle signal and communicated to the generator 32, the value for VBATOPT must first be adjusted to properly take into consideration the voltage "line drop" between the generator 32 and the battery 54 due to one or more electrical loads interposed between the generator 32 and the battery 54, for example, at the junction box 78. This line drop voltage between the generator 32 and the battery 54 is represented by the variable GENBATLD. In addition, the value for VBATOPT must also be adjusted to properly take into consideration errors introduced into optimum voltage calculations that are inherent in the system 30.

1. Determining Voltage Line Drop from Electrical Loads

As suggested by FIG. 5, a value for GENBATLD representing the voltage line drop between the generator 32 and the battery 54 is determined, for example, from an equation or algorithm 216 such as GENBATLD=LDNORM2+(RDFGST×LD2RDFG)+(BLWRFSP× LD2BLWR)+(COOLFSP×LD2CFSP)+(HIBMST×LD2HIBM) (32)

In this equation, the variable LDNORM2 represents a line drop factor which is inherent in the particular structural configuration of the system 30, apart from any voltage line drop between the generator 32 and the battery 54 due to specific electrical loads interposed therebetween, and is stored in the memory within the BCM 48. RDFGST, HIBMST, BLWRFSP, and COOLFSP, on the other hand, are variables having values communicated to the BCM 48 via the SDL 46 from the ECM 36 or respective body controllers (BC's) which are associated with various electrical loads within the system 30. In this example, the flag variable RDFGST, the duty cycle variable BLWRFSP, the duty cycle variable COOLFSP, and the flag variable HIBMST indicate whether the rear window defogger 88 is on, the particular fan speeds of the front and rear HVAC blowers 80, the particular fan speeds of the engine cooling fans 96, and whether the hi-beam headlights are on. Associated with each of these electrical loads is a corresponding predetermined voltage line. drop factor (LD2RDFG, LD2BLWR, LD2CFSP, and LD2HIBM) which may be factored into the equation for ultimately determining the sum total line drop GENBATLD between the generator 32 and the battery 54. These load-specific line drop factors LD2RDFG, LD2BLWR, LD2CFSP, and LD2HIBM, as well as any other drop factors for other electrical loads, are stored in memory within the BCM 48. A calculated value for GENBATLD typically ranges from about 0 volts to about 1 volt.

2. Compensating for System Errors

As alluded to earlier, before an optimum charge voltage for the battery 54 is converted into an electric PWM duty cycle signal and communicated to the generator 32, the value for VBATOPT must also be adjusted to properly take into consideration errors introduced into optimum voltage calculations that are inherent in the system 30.

For example, as illustrated in FIG. 4 and FIG. 5, the BCM 48 makes a correction for any voltage difference between variable VBATOPT, wherein VBATOPT is a desired value for the optimum charge voltage for the battery 54, and a variable VBATFB, wherein VBATFB represents a filtered feedback value of the sensed and corrected battery voltage VBATCRT as described earlier herein. As an example, the filtered feedback voltage VBATFB is determined from a first-order filter equation of the following form or equivalent,

VBATFB=VBATFB+((VBATCRT−VBATFB)×(RFC_VOLT/ 256)), (33)

wherein RFC_VOLT is the filter constant and has an associated filter time constant. Once a value for VBATFB is determined, values for both VBATFB and VBATOPT are compared with a comparator 218 to determine a value for variable ERRDIFF which represents the difference, if any, between the values of VBATFB and VBATOPT. If there is a difference between VBATFB and VBATOPT (which is typically the case), an up/down integrator with counter 224 determines an error correction value represented by variable ERRCORR. In general, the up/down integrator with counter 224 is updated at a predetermined update rate. In addition, the integrator with counter 224 is stopped or halted with algorithm 222 any time the value for VBATFB is determined to have dropped below a calibrated value VCAL (in volts), or if the filtered value for variable FDTYCYC is determined to exceed a predetermined duty cycle value $DC_{pv}$ (expressed as a percentage). In this way, the integrator with counter 224 serves to provide an error correction value for variable ERRCORR which, when used to adjust the value for a desired optimum charge voltage, helps future values of VBATFB to better conform with the value for VBATOPT.

Regarding variable FDTYCYC, the ECM 36 senses real-time electric duty cycle signals as feedback from the F-terminal 70 of the generator 32 while the generator 32 is operating. Once these signals are received by the ECM 36, the ECM 36 assigns data values for the signals to the variable FDTYCYC and conveys the variable FDTYCYC via the SDL 46 to the BCM 48. As illustrated in FIG. 5, once a value for the variable FDTYCYC is received by the BCM 48, the value is subjected to a digital filter 214 and is thereafter used to help determine, via the algorithm 222, an error correction value for variable ERRCORR.

It is to be understood that the comparator 218 and the integrator with counter 224 together comprise a proportional-integral (PI) controller algorithm. The "proportional part" and the "integral part" essentially determine the difference between VBATFB and VBATOPT and thereafter define the step size over time for incrementing or decrementing ERRCORR so that future differences between VBATFB and VBATOPT are further minimized or altogether eliminated.

3. Determining an Adjusted Optimum Charge Voltage

As illustrated in FIG. 5, once values for both GENBATLD and ERRCORR are determined, the value for the optimum charge voltage VBATOPT is used by a summator 226 to determine an adjusted value for the optimum charge voltage, represented by variable VBATADJ, according to the following equation.

$$VBATADJ=VBATOPT+GENBATLD+ERRCORR \quad (34)$$

This step of adjusting the optimum charge voltage for the battery 54 is depicted in FIG. 4 by flow diagram box 188.

P. Converting Adjusted Charge Voltage into PWM Signal

Once a value is determined for adjusted optimum charge voltage VBATADJ, the BCM 48 then conventionally converts the value into an electric pulse-width modulated (PWM) duty cycle signal represented by variable VBATDC. FIG. 13 shows a table illustrating how values for the duty cycle signal VBATDC are determined and relate to values for the adjusted optimum charge voltage VBATADJ.

Figure 14:
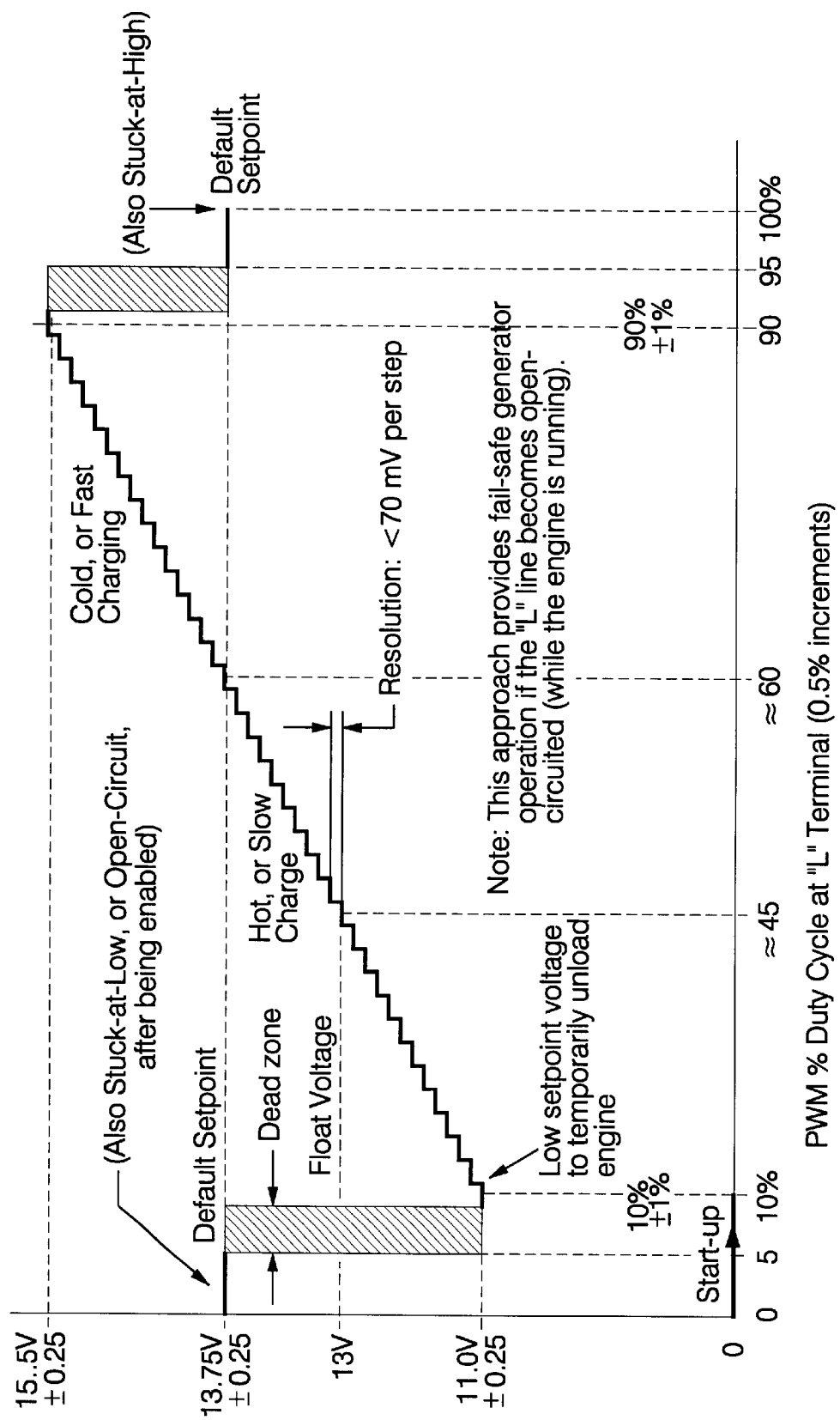
FIG. 14 is a chart illustrating how an adjusted value for an optimum charge voltage of a battery is converted to a value for an electric pulse-width modulated duty cycle signal applied to the L-terminal of a generator.

Instead of using the table in FIG. 13, however, a linear equation, such as the equation immediately below, conforming to the predetermined plotted data within the chart in FIG. 14 can also be used to determine values for VBATDC.

$$VBATDC=(OPK1 \times VBATADJ)-OPK2 \quad (35)$$

In equation (35), both OPK1 and OPK2 are calibratable constants.

Once a value for VBATDC is determined, the BCM 48 communicates the value via the SDL 46 to the ECM 36. The value for VBATDC delivered to the ECM 36 is, for example, preferably bounded between a minimum calibrated value and a maximum calibrated value and is updated at a predetermined update rate. Should the SDL 46 ever malfunction or "go down," the ECM 36 then assigns, for example, a default value of 100% to VBATDC which corresponds to a constant optimum voltage value.

Once received by the ECM 36, the ECM 36 communicates the electric PWM duty cycle signal VBATDC to the L-terminal 68 of the generator 32 via the conductor 64. Once the value associated with VBATDC is received by the generator 32, the generator 32 then strictly conforms the charge voltage ultimately delivered via the output terminal (B+) 76 to the battery 54 with the value for VBATDC. In this way, the charge voltage ultimately delivered to the battery 54 for recharging the battery 54 is thereby regulated by the adjusted optimum charge voltage VBATADJ as determined by the BCM 48.

This step of converting the adjusted optimum charge voltage value VBATADJ into an electric PWM duty cycle signal VBATDC is depicted in FIG. 4 by flow diagram box 190.

Q. Monitoring the Filtered Battery Voltage

As the BCM 48 continues to dictate the output voltage of the generator 32, the BCM 48 also carefully monitors the value of the filtered battery voltage VBATFLT, the value of feedback duty cycle signal FDTYCYC as sensed from the F-terminal 70 of the generator 32, and a flag variable GENFLT to make sure that the generator 32 is delivering a proper charge voltage to the battery 54. At any point in time, the flag variable GENFLT has either a low value ("0" or "false") or a high value ("I" or "true") depending on whether the fault detection circuit 144 (see FIG. 2) detects a fault or malfunction during operation of the generator 32. The value for GENFLT is communicated by the ECM 36 to the BCM 48 via the SDL 46. In general, the BCM 48 monitors the value of the filtered battery voltage VBATFLT to ensure that the value is not too high and does not exceed, for example, 16.1 volts. If the BCM 48 determines that the value of the filtered battery voltage VBATFLT is indeed too high, the BCM 48 then utilizes the SDL 46 within the system 30 to take appropriate corrective measures.

Further, if the BCM 48 determines that the value for VBATFLT is outside of the range of, for example, 6 to 18 volts, or more preferably 7 to 17 volts, for more than 40 seconds while the engine is running, the BCM 48 will then enter a "failure state." Likewise, if the value for FDTYCYC is between, for example, 20% to 80% for more than 40 seconds and the value of VBATFLT is outside the range of 13 to 16 volts, the BCM 48 will then enter the failure state as well. In the failure state, the BCM 48 communicates a message via the SDL 46 to the ECM 36 requesting that idle boost levels 0, 2, and 3 all be cleared and that entry into idle boost level 1 be initiated. Also, the BCM 48 communicates a message via the SDL 46 to the body controllers requesting that load shed levels 1, 2, and 3 all be cleared. Whenever the value for VBATFLT returns to a normal voltage range for 5 seconds, the BCM 48 will then exit the failure state.

This step of monitoring the value of VBATFLT is depicted in FIG. 6 by flow diagram box 194.

R. Using Software Counters for Diagnostics

In FIG. 6, for diagnostic purposes, the BCM 48 includes a software counter 198 for counting the tally number of entries into each upper level idle boost level (levels 1, 2, and 3 only) and saving each number in a non-volatile memory within the BCM 48. A separate tally number is maintained for each upper idle boost level and is incremented only when entry is made into an upper idle boost level particularly associated with the particular tally number. In this way, three separate tally numbers are maintained, one number for each respective upper idle boost level, which indicate how many times each upper idle boost level has been entered in recent history. Given such, it is expected that more entries for idle boost level 1 will typically be counted over a given period of time as compared to the numbers of entries counted for idle boost level 2 and idle boost level 3. Preferably, for example, a maximum count number of at least 32 will be allocated and permitted during a period of 40 ignition cycles. Once a tally number reaches its maximum allowable count number, that tally number will remain the same until subsequently changed. If, for example, no new entries are counted for idle boost level 2 or idle boost level 3 within a continuous period of 40 ignition cycles, then all three tally numbers will be reset to zero. However, if the tally numbers are not ever reset in this manner, the three tally numbers saved and stored in memory within the BCM 48 are accessible to service technicians via the SDL 46 and the DLC 52 whenever diagnostic tests are performed. Upon reading the tally numbers, a technician may then reset and initialize the tally numbers back to zero.

Similarly, the BCM 48 also includes a software counter 202 for counting the tally number of entries into each upper level load shed level (levels 1, 2, and 3 only) and saving each number in a non-volatile memory within the BCM 48. A separate tally number is maintained for each upper load shed level and is incremented only when entry is made into an upper load shed level particularly associated with the particular tally number. In this way, three separate tally numbers are maintained, one number for each respective upper load shed level, which indicate how many times each upper load shed level has been entered in recent history. Given such, it is expected that more entries for load shed level 1 will typically be counted over a given period of time as compared to the numbers of entries counted for load shed level 2 and load shed level 3. Preferably, for example, a maximum count number of at least 32 will be allocated and permitted during a period of 40 ignition cycles. Once a tally number reaches its maximum allowable count number, that tally number will remain the same until subsequently changed. If, for example, no new entries are counted for load shed levels 1, 2, or 3 within a continuous period of 40 ignition cycles, then all three tally numbers will be reset to zero. However, if the tally numbers are not ever reset in this manner, the three tally numbers saved and stored in memory within the BCM 48 are accessible to service technicians via the SDL 46 and the DLC 52 whenever diagnostic tests are performed. Upon reading the tally numbers, a technician may then reset and initialize the tally numbers back to zero.

S. Saving Values for Start-up SOC and Running SOC for Diagnostics

Figure 7:
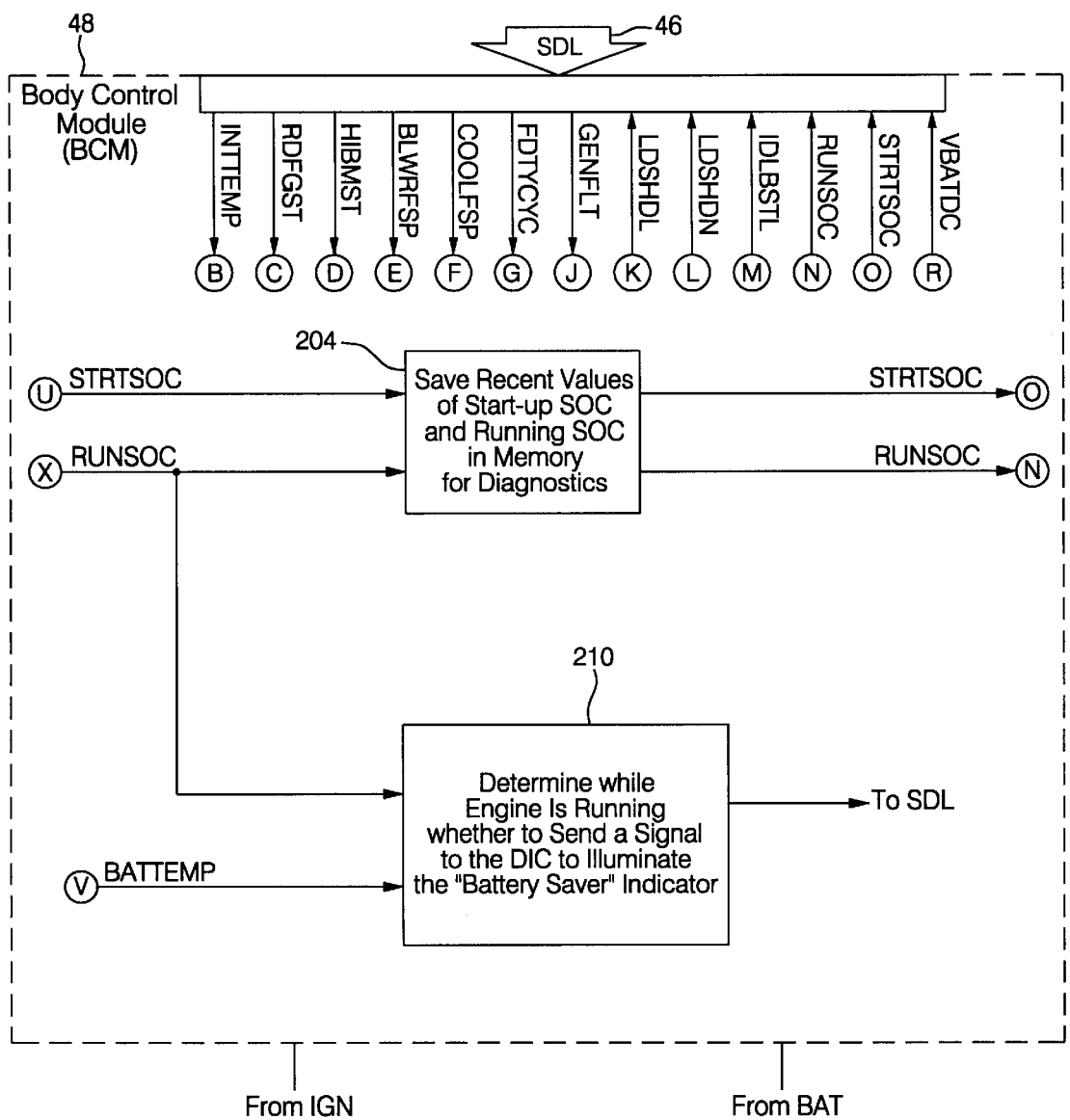
FIG. 7 is an electrical block diagram of the body control module in FIG. 1, wherein another continuation of the software variables diagram of FIG. 4 is illustrated and highlights how certain software variables are saved in memory for diagnostic testing.

In FIG. 7, the BCM 48 saves the last, for example, six values of both the start-up state of charge STRTSOC of the battery 54 and the running state of charge RUNSOC of the battery 54 in a non-volatile memory within the BCM 48. In this way, these recent values are easily accessible via the SDL 46 and the DLC 52 and can be read during diagnostic tests performed by technicians to determine the operational health of the battery 54. As a result, the possibility of accidentally and prematurely replacing a battery which is still good is thereby reduced.

This step of saving recent values of both RUNSOC and STRTSOC in memory for diagnostic purposes is depicted in FIG. 7 by flow diagram box 204.

T. Example

In general, when the ignition switch is placed into the key-on position, the steps set forth hereinabove for executing the method 160 according to the present invention are executed, for example, every 500 milliseconds. In particular, the voltage of the battery 54 is preferably sensed at least two times per second. In light of such, battery amp-hour determinations are based on a 500-millisecond average method cycle time. Furthermore, when the engine is running, the output voltage of the generator 32 is, for the most part, maintained within a voltage range of about 13 to 16 volts.

As an example, FIG. 15 shows a plotted comparison between the regulated charge voltage delivered to a hot battery during operation of the present invention and the regulated charge voltage delivered to a cold battery during operation of the present invention. Regarding the hot battery, after the engine is initially started up, the charge voltage is quickly ramped up along voltage plot section 230 to about 14 or 15 volts. Quickly establishing the charge voltage at such a high voltage level after engine startup is desirable, for such serves to recharge the battery sooner and improves the state of charge of the battery even if the automobile is driven for a very short trip. Since the battery is hot and is thereby quickly recharged much sooner than a cold battery would be, the charge voltage is soon thereafter reduced to a "floating" voltage of only about 13.4 volts along voltage plot section 234. Such a low charge voltage is very desirable and helps prevent overcharging and gassing of the battery. As a result, the low charge voltage helps conserve and extend battery life as well as improve automobile fuel economy and extend the lamp life of lights within the automobile. Regarding the cold battery in FIG. 15, after the engine is started up, the charge voltage is slowly ramped up to about 15.5 volts. The slower ramping of the charge voltage for the cold battery after engine start-up, as compared to the hot battery, serves to improve engine performance and idle stability in cold weather. Ramping the charge voltage for the cold battery up to such a high voltage level of about 15.5 volts along voltage plot section 238, as compared to the 14 to 15 volts for the hot battery, serves to compensate for the adverse effect of the cold weather on the state of charge of the battery. Since the battery is cold, the length of time necessary for recharging the battery along voltage plot sections 238 and 242, as compared to the hot battery, is significantly longer. Even before the battery is completely recharged, the charge voltage delivered to the battery can be temporarily lowered (along voltage plot section 240) by the ECM to reduce generator load and thereby prevent the stalling of the engine when necessary. After being temporarily lowered in this manner, the charge voltage for the battery can again be ramped up so that recharging of the battery can be completed. Once recharging of the battery is completed along voltage plot section 242, the charge voltage is reduced to a floating voltage of about 13.5 volts to help conserve and extend battery life as well as improve automobile fuel economy and extend the lamp life of lights within the automobile.

In summary, the present invention set forth hereinabove provides a method of regulating a charge voltage delivered to a battery in an automobile that has an engine and an ignition system capable of being activated with an ignition switch. The method, when implemented, successfully and accurately monitors both the temperature and the state of charge of the battery, timely and precisely adjusts the output voltage of a generator to prevent undercharging and overcharging as well as gassing in the battery, improves battery life and the life of various lights within the automobile, and improves overall automobile fuel economy. To implement the method, the present invention also provides a system for regulating a charge voltage delivered to a battery in an automobile. Furthermore, the system requires only a minimal amount of wiring and electronic components and thereby helps reduce the production costs associated therewith.

While the present invention has been described in what is presently considered to be the most practical and preferred embodiment and/or implementation, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures as is permitted under the law.

We claim:

1. A method of regulating a charge voltage delivered to a battery in an automobile having an engine and an ignition system capable of being activated with an ignition switch, said method comprising the steps of:
    (a) periodically estimating the electrolyte temperature of said battery when said ignition switch is on;
    (b) periodically sensing the voltage of said battery when said ignition switch is on;
    (c) estimating the electric current of said battery using said estimated electrolyte temperature and said sensed voltage;
    (d) estimating the amp-hours into said battery using said estimated electric current;
    (e) estimating the state of charge of said battery, when said engine is running, using said estimated amp-hours;
    (f) determining an optimum charge voltage for said battery using said running state of charge and said estimated electrolyte temperature;
    (g) adjusting said optimum charge voltage using said sensed voltage;
    (h) communicating said optimum charge voltage to a generator; and
    (i) delivering a charge voltage to said battery using said generator, wherein said charge voltage is regulated by said optimum charge voltage.

2. The method according to claim 1, said method further comprising the step (aa) of periodically sensing the open-circuit voltage of said battery when said ignition switch is off for helping estimate the state of charge of said battery when said ignition switch is later initially turned on for starting up said engine.

3. The method according to claim 2, wherein said step (aa) is accomplished with a voltage sensing circuit comprising an analog-to-digital converter.

4. The method according to claim 3, said method further comprising the step of adjusting said sensed open-circuit voltage with at least one correction factor relating to at least one of production variance, temperature sensitivity, and voltage range sensitivity of said voltage sensing circuit.

5. The method according to claim 2, said method further comprising the step (bb) of estimating the state of charge of said battery, when said ignition switch is initially turned on for starting up said engine, using said sensed open-circuit voltage and said estimated electrolyte temperature.

6. The method according to claim 5, said method further comprising the steps of:
    determining the length of time that said ignition switch was off when said ignition switch is initially turned on; and
    performing said step (bb) only when said length of time that said ignition switch was off is greater than a predetermined rest time for said battery.

7. The method according to claim 5, wherein said step (e) includes the step of estimating the state of charge of said battery when said engine is running by also using said estimated start-up state of charge.

8. The method according to claim 7, said method further comprising the step of saving recent voltage level values of said start-up state of charge and said running state of charge in at least one memory capable of being read for diagnostic testing.

9. The method according to claim 1, wherein said step (a) includes the step of sensing the temperature of the air entering into said engine.

10. The method according to claim 1, wherein said step (b) is accomplished with a voltage sensing circuit comprising an analog-to-digital converter.

11. The method according to claim 10, said method further comprising the step of adjusting said sensed voltage with at least one correction factor relating to at least one of production variance, temperature sensitivity, and voltage range sensitivity of said voltage sensing circuit.

12. The method according to claim 11, said method further comprising the step of adjusting said sensed voltage with at least one additional correction factor relating to at least one of various electrical loads electrically connected to at least one of said generator and said battery when said ignition switch is on and said engine is running.

13. The method according to claim 12, said method further comprising the step of filtering said sensed and corrected voltage.

14. The method according to claim 13, wherein estimating the electric current of said battery in said step (c) is particularly accomplished by using said estimated electrolyte temperature and said filtered voltage.

15. The method according to claim 13, said method further comprising the steps of:
    monitoring said filtered voltage to determine whether the voltage level of said filtered voltage is outside of a predetermined voltage range; and
    activating a visual warning indicator when said voltage level of said filtered voltage is outside of said predetermined voltage range.

16. The method according to claim 1, said method further comprising the step of determining a boost level of the idle speed of said engine using said running state of charge and said estimated amp-hours.

17. The method according to claim 16, wherein said boost level is one of a plurality of predefined idle speed boost levels.

18. The method according to claim 17, said method further comprising the steps of:
    counting the number of entries into each upper boost level of said predefined idle speed boost levels; and
    saving each said number of entries in a memory capable of being read for diagnostic testing.

19. The method according to claim 1, said method further comprising the step of determining a shed level of various electrical loads electrically connected to at least one of said generator and said battery using said running state of charge and said estimated amp-hours.

20. The method according to claim 19, wherein said shed level is one of a plurality of predefined electrical load shed levels.

21. The method according to claim 20, said method further comprising the steps of:
    counting the number of entries into each upper shed level of said predefined electrical load shed levels; and
    saving each said number of entries in a memory capable of being read for diagnostic testing.

22. The method according to claim 1, wherein said step (g) is accomplished with a proportional-integral controller comprising a comparator for comparing said sensed voltage with said optimum charge voltage.

23. The method according to claim 1, said method further comprising the steps of:
   determining a line drop voltage between said generator and said battery; and
   further adjusting said optimum charge voltage, before communicating said optimum charge voltage to said generator, using said line drop voltage.

24. The method according to claim 1, wherein said step (h) includes the steps of:
   converting said optimum charge voltage into an electric pulse-width modulated duty cycle signal; and
   communicating said duty cycle signal to said generator.

25. The method according to claim 24, wherein said charge voltage of said step (i) is particularly regulated by said duty cycle signal.

26. A method of regulating a charge voltage delivered to a battery in an automobile having an engine and an ignition system capable of being activated with an ignition switch, said method comprising the steps of:
   (a) periodically estimating the electrolyte temperature of said battery when said ignition switch is on;
   (b) periodically sensing the voltage of said battery;
   (c) estimating the electric current of said battery using said estimated electrolyte temperature and said sensed voltage;
   (d) estimating the amp-hours into said battery using said estimated electric current;
   (e) estimating the state of charge of said battery, when said engine is running, using said estimated amp-hours;
   (f) determining an optimum charge voltage for said battery using said running state of charge and said estimated electrolyte temperature;
   (g) adjusting said optimum charge voltage using said sensed voltage;
   (h) communicating said optimum charge voltage to a generator; and
   (i) delivering a charge voltage to said battery using said generator, wherein said charge voltage is regulated by said optimum charge voltage.

27. A method of regulating a charge voltage delivered to a battery in an automobile having an engine and an ignition system capable of being activated with an ignition switch, said method comprising the steps of:
   (a) periodically sensing the open-circuit voltage of said battery when said ignition switch is off;
   (b) periodically estimating the electrolyte temperature of said battery when said ignition switch is on;
   (c) estimating the state of charge of said battery when said ignition switch is initially turned on for starting up said engine using said sensed open-circuit voltage and said estimated electrolyte temperature;
   (d) periodically sensing the voltage of said battery when said ignition switch is on and said engine is running;
   (e) estimating the electric current of said battery using said estimated electrolyte temperature and said sensed voltage;
   (f) estimating the amp-hours into said battery using said estimated electric current;
   (g) estimating the state of charge of said battery when said engine is running using said estimated start-up state of charge and said estimated amp-hours;
   (h) determining an optimum charge voltage for said battery using said running state of charge and said estimated electrolyte temperature;
   (i) adjusting said optimum charge voltage using said sensed voltage;
   (j) converting said optimum charge voltage into an electric pulse-width modulated duty cycle signal;
   (k) communicating said duty cycle signal to a generator; and
   (l) delivering a charge voltage to said battery using said generator, wherein said charge voltage is regulated by said duty cycle signal.

28. A system for regulating a charge voltage delivered to a battery in an automobile having an engine, said system comprising:
   a generator having an output terminal capable of being electrically connected to said battery for delivering a charge voltage to said battery;
   an engine control module, electrically connected to said generator, capable of sensing an electric feedback signal from said generator;
   a sensor, electrically connected to said engine control module, capable of sensing the temperature of the air entering into said engine;
   an actuator, electrically connected to said engine control module, capable of adjusting the idle speed of said engine;
   a data link electrically connected to said engine control module;
   a body control module, electrically connected to said data link, capable of being electrically connected to said battery and having means for sensing the voltage of said battery;
   a plurality of body controllers electrically connected to said data link; and
   a plurality of electrical loads electrically connected to said body controllers and capable of being powered by at least one of said generator and said battery;
   wherein said body control module is capable of determining an optimum charge voltage for said battery, adjusting said idle speed of said engine, and selectively shedding said electrical loads using said sensed electric feedback signal, said sensed air temperature, and said sensed battery voltage; and
   wherein said engine control module is capable of communicating said optimum charge voltage to said generator such that said generator is capable of delivering a charge voltage to said battery which is regulated by said optimum charge voltage.

29. The system according to claim 28, wherein said generator has a first terminal electrically connected to said engine control module, wherein said engine control module is capable of communicating said optimum charge voltage to said first terminal of said generator.

30. The system according to claim 29, wherein said engine control module has a detection circuit electrically connected to said first terminal of said generator, wherein said detection circuit is capable of detecting a fault in said generator.

31. The system according to claim 29, wherein said generator has a second terminal electrically connected to said engine control module, wherein said engine control module is capable of sensing said electric feedback signal from said second terminal of said generator.

32. The system according to claim 28, said system comprising a data link connector electrically connected to said data link, wherein said data link connector is capable of providing electrical access to said data link for diagnostic testing.

33. A system for regulating a charge voltage delivered to a battery in an automobile having an engine, said system comprising:
- a generator having a first terminal, a second terminal, and an output terminal, wherein said output terminal is capable of being electrically connected to said battery for delivering a charge voltage to said battery;
- an ignition system capable of being electrically connected to said battery;
- an engine control module electrically connected to said first terminal, said second terminal, and said ignition system, wherein said engine control module is capable of sensing an electric feedback signal from said second terminal;
- a sensor, electrically connected to said engine control module, capable of sensing the temperature of the air entering into said engine;
- an actuator, electrically connected to said engine control module, capable of adjusting the idle speed of said engine;
- a data link electrically connected to said engine control module;
- a body control module, electrically connected to said data link, capable of being electrically connected to said battery and having means for sensing the voltage of said battery;
- a plurality of body controllers electrically connected to said data link; and
- a plurality of electrical loads electrically connected to said body controllers and capable of being powered by at least one of said generator and said battery;

wherein said body control module is capable of determining an optimum charge voltage for said battery, adjusting said idle speed of said engine, and selectively shedding said electrical loads using said sensed electric feedback signal, said sensed air temperature, and said sensed battery voltage; and wherein said engine control module is capable of communicating said optimum charge voltage to said first terminal of said generator such that said generator is capable of delivering a charge voltage to said battery which is regulated by said optimum charge voltage.

* * * * *